US008156431B2

(12) United States Patent  (10) Patent No.: US 8,156,431 B2
Kobashi  (45) Date of Patent: Apr. 10, 2012

(54) ELIMINATING INCONSISTENCIES BETWEEN OBJECTS AND PAGE ATTRIBUTES IN AN ELECTRONIC DOCUMENT

(75) Inventor: Kazufumi Kobashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 12/641,962

(22) Filed: Dec. 18, 2009

(65) Prior Publication Data

US 2010/0174984 A1  Jul. 8, 2010

(30) Foreign Application Priority Data

Jan. 6, 2009 (JP) ................................. 2009-001106

(51) Int. Cl.
 *G06F 17/00* (2006.01)
(52) U.S. Cl. ........ 715/272; 715/209; 715/243; 715/249; 715/255
(58) Field of Classification Search .................. 715/209, 715/243, 249, 255, 272, 769, 770
See application file for complete search history.

(56) References Cited

U.S. PATENT DOCUMENTS

| 5,924,099 | A | * | 7/1999 | Guzak et al. ........................... 1/1 |
| 6,686,930 | B2 | * | 2/2004 | Powers et al. ................. 715/724 |
| 6,944,821 | B1 | * | 9/2005 | Bates et al. .................... 715/209 |
| 6,968,504 | B2 | * | 11/2005 | Broman et al. ............... 715/234 |
| 7,299,413 | B2 | * | 11/2007 | Mori .............................. 715/255 |
| 7,373,603 | B1 | * | 5/2008 | Yalovsky et al. ............. 715/255 |
| 7,689,925 | B2 | * | 3/2010 | Hahn et al. ..................... 715/770 |
| 7,757,165 | B1 | * | 7/2010 | Stuple et al. .................. 715/236 |
| 2004/0172584 | A1 | * | 9/2004 | Jones et al. ................... 715/500 |
| 2006/0029125 | A1 | | 2/2006 | Kobashi et al. |
| 2006/0170948 | A1 | | 8/2006 | Kobashi |
| 2008/0109464 | A1 | * | 5/2008 | Ozzie et al. ................... 707/101 |
| 2008/0109744 | A1 | * | 5/2008 | Ozzie et al. ................... 715/770 |
| 2009/0157741 | A1 | * | 6/2009 | Cheng et al. ............. 707/103 Y |

FOREIGN PATENT DOCUMENTS

JP  2006-260136 A  9/2006

* cited by examiner

*Primary Examiner* — Adam M Queler

(74) *Attorney, Agent, or Firm* — Fitzpatrick, Cella, Harper & Scinto

(57) ABSTRACT

In order to maintain consistencies of relations between objects and page attributes in document data, a document editing apparatus for editing document data including a plurality of pages, includes a determination unit which determines, when a process is executed for the document data, whether or not the process includes a move process or copy process of an object across pages, a composition unit which composites, when it is determined that the process includes the move process or copy process, information associated with a page attribute of an editing source page on which the object is currently laid out to the object to generate a composite object, and a layout unit which lays out the composite object as an object on an editing destination page as a move destination or copy destination.

7 Claims, 24 Drawing Sheets

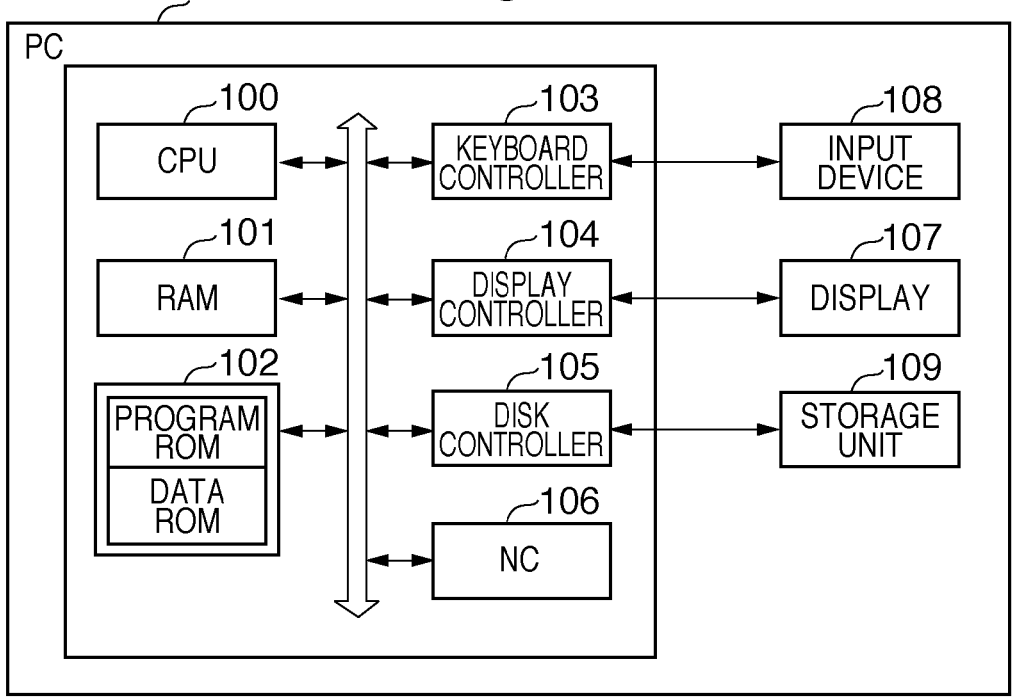
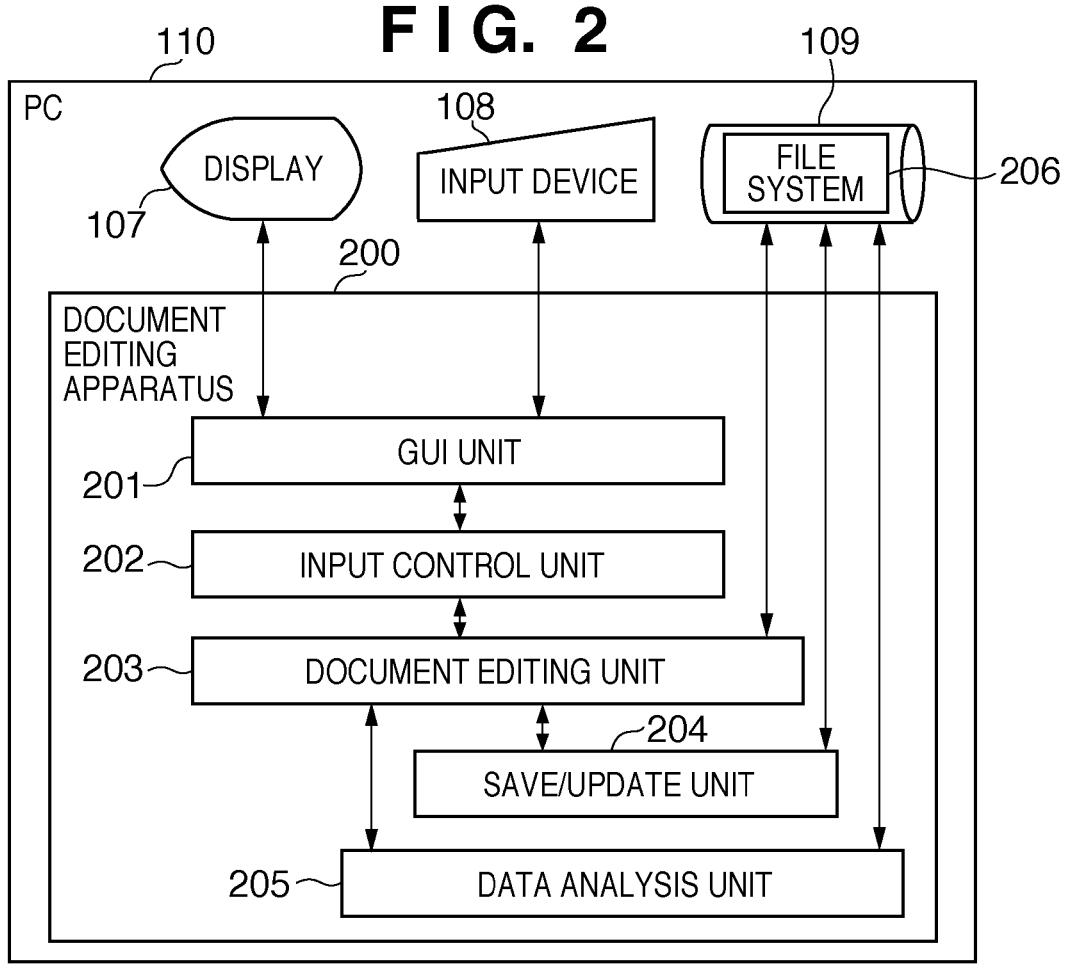

FIG. 4

| No | ATTRIBUTE INFORMATION | HELD INFORMATION, REMARKS |
|---|---|---|
| 1 | PRINT DIRECTION | XXX |
| 2 | PAPER SIZE | XXXXX |
| 3 | PAPER ORIENTATION | XXX |
| 4 | N-up PRINT | XXXXXXXXx |
| 5 | WATERMARK | WATERMARK ID, HOLD POSITION INFORMATION (COORDINATE) ON PAGE FOR ALL CHAPTERS / PAGES |
| 6 | HEADER / FOOTER | WATERMARK ID, HOLD POSITION INFORMATION (COORDINATE) ON PAGE FOR ALL CHAPTERS / PAGES |
| 7 | COMMENT / ANNOTATION | WATERMARK ID, HOLD POSITION INFORMATION (COORDINATE) ON PAGE FOR ALL CHAPTERS / PAGES |
| 8 | CHAPTER DIVISION | XX |
| 9 | XXX | XXXXXXXXXXXXXXX |

FIG. 5

| No | ATTRIBUTE INFORMATION | HELD INFORMATION, REMARKS |
|---|---|---|
| 1 | PAPER SIZE | XXXXX |
| 2 | PAPER ORIENTATION | XXX |
| 3 | N-up PRINT | XXXXXXXXx |
| 4 | WATERMARK | WATERMARK ID, HOLD POSITION INFORMATION (COORDINATE) ON PAGE APPLICATION / NON-APPLICATION INFORMATION OF WATERMARK DESIGNATED IN BOOK |
| 5 | HEADER / FOOTER | WATERMARK ID, HOLD POSITION INFORMATION (COORDINATE) ON PAGE APPLICATION / NON-APPLICATION INFORMATION OF HEADER / FOOTER DESIGNATED IN BOOK |
| 6 | COMMENT / ANNOTATION | WATERMARK ID, HOLD POSITION INFORMATION (COORDINATE) ON PAGE APPLICATION / NON-APPLICATION INFORMATION OF COMMENT / ANNOTATION DESIGNATED IN BOOK |
| 7 | XXX | XXXXXXXXXXXXXXX |

FIG. 6

| No | ATTRIBUTE INFORMATION | HELD INFORMATION, REMARKS |
|---|---|---|
| 1 | PAGE ROTATION DESIGNATION | XXXXX |
| 2 | WATERMARK | WATERMARK ID, HOLD POSITION INFORMATION (COORDINATE) ON PAGE APPLICATION / NON-APPLICATION INFORMATION OF WATERMARK DESIGNATED IN BOOK / CHAPTER |
| 3 | HEADER / FOOTER | WATERMARK ID, HOLD POSITION INFORMATION (COORDINATE) ON PAGE APPLICATION / NON-APPLICATION INFORMATION OF HEADER / FOOTER DESIGNATED IN BOOK / CHAPTER |
| 4 | COMMENT / ANNOTATION | WATERMARK ID, HOLD POSITION INFORMATION (COORDINATE) ON PAGE APPLICATION / NON-APPLICATION INFORMATION OF COMMENT / ANNOTATION DESIGNATED IN BOOK / CHAPTER |
| 5 | ZOOM RATIO | XXX |
| 6 | XXX | XXXXXXXXXXXXXXXX |

FIG. 7

| ID | CHARACTER STRING | FONT | SIZE | STYLE | BINARY DATA | REFERENCE DESTINATION |
|---|---|---|---|---|---|---|
| 1 | CONFIDENTIAL | Arial | 60 | ITALIC / BOLD | - | - |
| 2 | COPY | MS GOTHIC | 60 | BOLD | - | - |
| 3 | DRAFT | MS GOTHIC | 60 | BOLD | - | - |
| 4 | OFFICIAL | MS MING | 60 | ITALIC | - | - |
| 5 | SECRET | MSP GOTHIC | 60 | BOLD | 00 00 00 00 zz.. | - |
| 6 | SAMPLE | MS MING | 60 | BOLD | - | - |
| 7 | SECRET | MING | 60 | ITALIC | - | - |
| 8 | - | - | - | - | 00 00 af 00 f1.. | - |
| 9 | - | - | - | - | - | \\my image\a.jpg |

FIG. 15

WATERMARK DEFINITION

1501 — WATERMARK LIST
- ★ Text : CONFIDENTIAL
- ★ Text : SAMPLE
- ☆ Image : SECRET
- ★ Text : SECRET ATTRIBUTE
- 1502 — TEXT : CONFIDENTIAL
- 1503 — FONT : MS MING
- 1504 — STYLE : NORMAL
- 1505 — SIZE : 60 POINTS
- 1506 — COLOR :

[ OK ]  [ Cancel ]  [ APPLY ]

FIG. 16

1601 — WATERMARK DESIGNATION

1602 — SELECT WATERMARK
- ★ Text : CONFIDENTIAL
- ★ Text : SAMPLE
- ☆ Image : SECRET
- ★ Text : SECRET

COORDINATE (CENTER(0,0))

1603 — X : 15 (−100∼100)

Y : 40 (−100∼100)

[ OK ]  [ Cancel ]  [ APPLY ]

| ID | TYPE | CHARACTER STRING | FONT | SIZE | FILL | STYLE | BINARY DATA | REFERENCE DESTINATION |
|---|---|---|---|---|---|---|---|---|
| 1 | TEXT BOX | IMPORTANT | Arial | 18 | - | ITALIC/BOLD | - | - |
| 2 | SPEECH BALLOON TEXT | PLEASE MODIFY | MS GOTHIC | 12 | - | BOLD | - | - |
| 3 | IMAGE | - | - | - | - | | - | \\my image\a.jpg |
| 4 | MARKER | - | - | - | 0034 | | - | - |
| 5 | HATCHING | PLEASE REVIEW | MSP GOTHIC | 20 | 0109 | BOLD | 00 00 00 00 zz... | - |

ELIMINATING INCONSISTENCIES BETWEEN OBJECTS AND PAGE ATTRIBUTES IN AN ELECTRONIC DOCUMENT

BACKGROUND OF THE INVENTION

1. Field of the Invention

The present invention relates to a technique for editing an electronic document and, more particularly, to a technique for eliminating inconsistencies between objects and page attributes included in an electronic document.

2. Description of the Related Art

In a document editing system, a technique for appending, as a page attribute, a watermark such as "SECRET" or "NO COPY" to pages that form a document to be processed is known. Also, a technique which allows a document to hold a plurality of page attributes, and selectively appends different page attributes for respective pages is similarly known. On the other hand, in an identical document editing system, a technique for extracting information of each rendering object (for example: a character, character string, or image) in each page that forms a document to be edited, and executing various editing processes (for example: move, delete, and copy) is known. It is desirable for the user to be able to use the aforementioned two techniques in a workflow series, and it is a common practice to implement these techniques in a single document editing system.

In general, since each page attribute and each rendering object in a page are individually managed, the editing process of the rendering object is not synchronized with the page attribute. For this reason, the set page attribute often becomes insignificant depending on the editing contents of the rendering object. For example, when a page attribute "SECRET" is set, but a rendering object which is set as a secret information target is deleted, a page does not include any object as the secret information target although the page attribute "SECRET" is set. Hence, Japanese Patent Laid-Open No. 2006-260136 (patent reference 1) has proposed a technique for appending a corresponding page attribute to a page that includes a keyword (for example, a character string "SECRET") of a rendering object by associating the keyword with the page attribute.

However, at the time of use of the technique of patent reference 1, when a page has different page attributes before and after the editing process, a new page attribute is unwantedly additionally appended to an existing rendering object to which a page attribute need not be originally appended. That is, since rendering objects and page attributes are independently managed, an attribute can only be moved for each page.

FIG. 36 depicts the aforementioned problem. Reference numeral 3601 denotes a page; 3602, a page attribute (watermark); and 3603 and 3604, rendering objects. When the rendering object 3604 is moved from the second page to the first page, as denoted by reference numeral 3605, the page attribute (watermark) set in the second page is set as that of the first page as a move destination, as denoted by reference numeral 3606. For this reason, the setting of the page attribute (in case of FIG. 36, "SECRET" enclosed in a circle) is unwantedly reflected to a rendering object 3607 originally included in the first page.

SUMMARY OF THE INVENTION

According to one aspect of the present invention, a document editing apparatus for editing document data including a plurality of pages, comprises: a determination unit configured to determine, when a process is executed for the document data, whether or not the process includes a move process or a copy process of an object across pages; a composition unit configured to composite, when the determination unit determines that the process includes the move process or the copy process, information associated with a page attribute of an editing source page on which the object is currently laid out to the object to generate a composite object; and a layout unit configured to lay out the composite object generated by the composition unit as an object on an editing destination page as a move destination or a copy destination.

According to another aspect of the present invention, a method of controlling a document editing apparatus for editing document data including a plurality of pages, comprises the steps of: determining, when a process is executed for the document data, whether or not the process includes a move process or a copy process of an object across pages; compositing, when it is determined in the determining step that the process includes the move process or the copy process, information associated with a page attribute of an editing source page on which the object is currently laid out to the object to generate a composite object; and laying out the composite object generated in the compositing step as an object on an editing destination page as a move destination or a copy destination.

According to the present invention, a technique which can eliminate inconsistencies between objects and page attributes which occur based on the editing processes of objects in an electronic document.

Further features of the present invention will become apparent from the following description of exemplary embodiments (with reference to the attached drawings).

BRIEF DESCRIPTION OF THE DRAWINGS

FIG. 1 is a block diagram showing the hardware arrangement of a PC which configures a document editing apparatus according to the first embodiment;

FIG. 2 is a block diagram showing the software configuration of the PC which configures the document editing apparatus according to the first embodiment;

FIG. 4 is a view showing a book attribute list;

FIG. 5 is a view showing a chapter attribute list;

FIG. 6 is a view showing a page attribute list;

FIG. 7 is a view showing a data list of watermark attributes;

FIG. 15 is a view showing a watermark definition dialog 1501;

FIG. 16 is a view showing a watermark designation dialog 1601;

DESCRIPTION OF THE EMBODIMENTS

Figure 3:
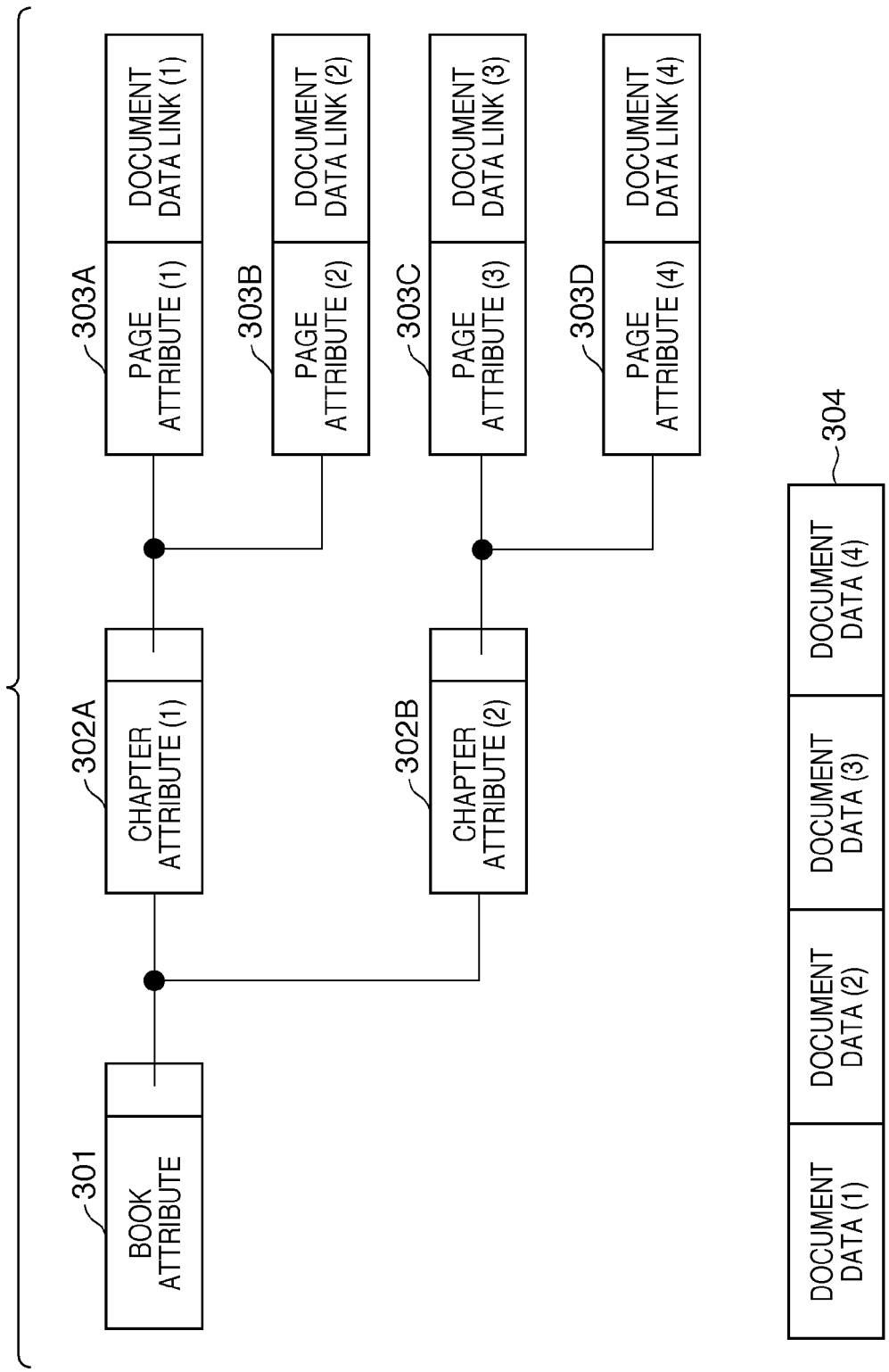
FIG. 3 is a view illustrating the format of document data.

Preferred embodiments of the present invention will be described in detail hereinafter with reference to the drawings. Note that embodiments to be described hereinafter are merely examples, and do not limit the scope of the present invention.

First Embodiment

A document editing apparatus configured by an information processing apparatus (PC) will be exemplified below as the first embodiment of a document editing apparatus according to the present invention.

<Apparatus Arrangement>

FIG. 1 is a block diagram showing the hardware arrangement of a PC which configures a document editing apparatus according to the first embodiment. The hardware arrangement shown in FIG. 1 corresponds to that of a general information processing apparatus, and the hardware arrangement of the general information processing apparatus can be applied to a PC 110 of the first embodiment.

Referring to FIG. 1, a CPU 100 executes programs such as an operating system (OS) and applications, which are stored in a ROM 102 or are loaded from a storage unit 109 onto a RAM 101. Note that respective processes to be described later are implemented when the CPU 100 executes programs. The RAM 101 serves as a main memory, work area, and the like of the CPU 100. A keyboard controller 103 controls inputs from an input device 108 which includes a keyboard and pointing device (e.g., a mouse). A display controller 104 controls display of a display 107. A disk controller 105 controls data accesses to the storage unit 109 (e.g., a hard disk (HD) or floppy® disk (FD)) which stores various data. A network controller (NC) 106 executes a communication control process with other devices connected to a network.

FIG. 2 is a block diagram showing the software configuration of the PC which configures the document editing apparatus according to the first embodiment. All functions of a document editing apparatus 200 according to the first embodiment are implemented by programs executed on the PC 110, as has been described in the hardware arrangement.

The document editing apparatus 200 includes a graphic user interface (GUI) unit 201 which is displayed on the display 107 of the PC 110 and accepts inputs from the input device 108 including the keyboard/mouse. Also, the document editing apparatus 200 includes an input control unit 202 which detects user's operations at the keyboard via the GUI unit 201, and instructs to edit a document, to save a file, and so forth in accordance with the operations. Furthermore, the document editing apparatus 200 includes a document editing unit 203 which controls various editing processes of document data, whose editing operation is in progress in the document editing apparatus, in accordance with the editing instruction of the input control unit 202. The document editing apparatus 200 includes a save/update unit 204 which instructs a file system 206 to save or update document data in accordance with the editing instruction of the input control unit 202. Moreover, the document editing apparatus 200 includes a data analysis unit 205 which analyzes document data and generates rendering objects under the control of the document editing unit 203.

The document editing apparatus 200 provides, to the user, a function of loading document data and editing the loaded document data. The document data to be loaded may have a unique format or may be a data file of a general application.

Figure 14:
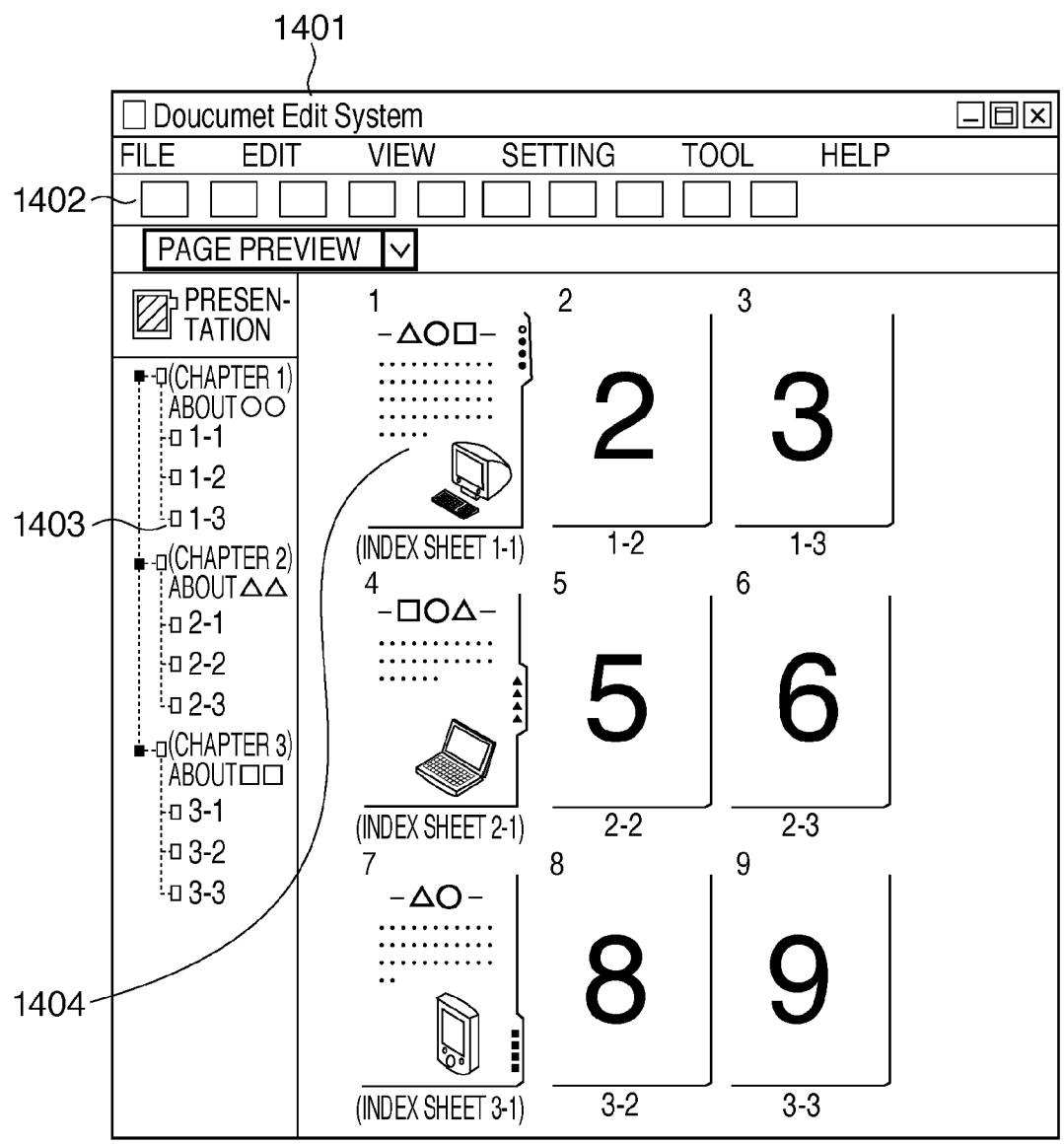
FIG. 14 is a view showing an example of display of a GUI unit 201 of the document editing apparatus.

FIG. 14 is a view showing an example of display of the GUI unit 201 of the document editing apparatus. The GUI unit 201 includes a main window 1401, menu/tool bar 1402, page list 1403, and page preview 1404.

<Data Structure>

Prior to a detailed description of the document editing apparatus 200, the data structure of document data including a plurality of pages will be described. The document data has a three-layer structure which imitates a book of a paper medium. An upper layer is called "book", which imitates a copy of a book, and defines attributes associated with the whole book. An intermediate layer under the upper layer corresponds to a chapter in case of a book, and is called "chapter". For each chapter, attributes can be defined. A lower layer is "page", and corresponds to each page defined by the document editing apparatus. As for each page, attributes can be defined. Furthermore, one book can include a plurality of chapters, and each chapter can include a plurality of pages.

Note that terms "book", "chapter", and "page" are used to express that document data is specified by three layers, but other terms may be used as long as they have equivalent configurations.

FIG. 3 is a view illustrating the format of document data. In this example, a book, each chapter, and each page are respectively indicated by corresponding nodes. One document data includes one book. The book and each chapter include defined attribute values and links to lower layers as their entities since they are the concepts required to define the structure as the book. Each page has its data as an entity. For this reason, each page includes an entity of a document page (document page data) and a link to each document page data.

Referring to FIG. 3, a book attribute is defined in a book 301, and two chapters 302A and 302B are linked to the book 301. These links indicate that the chapters 302A and 302B are included in the book 301. To the chapter 302A, pages 303A and 303B are linked to indicate that the chapter 302A includes these pages. For the pages 303A and 303B, attribute values are respectively defined, and these pages include links to document page data (1) and (2) as their entities. These links indicate data (1) and (2) of document page data 304, and represent that the entities of the pages 303A and 303B are the document page data (1) and (2).

FIG. 4 is a view showing a book attribute list. As for items which can be defined to overlap those of layers lower than the book attributes, attribute values of lower layers are preferentially adopted. Items which overlap those of lower layers are significant as prescribed values when they are not defined in lower layers. Note that each item shown in FIG. 4 does not practically correspond to one item, but it may also include a plurality of related items.

Three pieces of attribute information "watermark", "header/footer", and "comment/annotation" are those which are rendered on pages which belong to the book. The attribute information "watermark" includes an image, character string, or the like, which is printed to overlap document data and is designated separately (generally called a stamp). The attribute information "header/footer" includes watermarks which are printed on the top and bottom margins of each page. The attribute information "comment/annotation" includes an image or character string which is designated on each page or margin.

In the first embodiment, "watermark" includes "header/footer" and "comment/annotation" unless otherwise specified. In "header/footer", items such as a page number and date & time, which can be designated using variables, are prepared. These watermarks are overlaid on each document page in place of a contents data layer as a text image which forms each document data.

More specifically, information of each watermark to be managed by the above list includes a watermark ID and position information on each page (to be described later). The data format of the position information on each page is not particularly limited. For example, the position information may be held in a format as X-Y coordinates on each page. Also, the position information may be held in different formats depending on watermark types. For example, in case of a stamp, a certain position on each page may be held as a point. However, in case of a comment which hatches a certain range, position information may be held as a range from a certain point to another point. Hence, in the book attribute list in FIG. 4 and lists in FIGS. 5 and 6 to be described later, the position information can be held in a format of either a point or range.

FIG. 5 shows a chapter attribute list, and FIG. 6 shows a page attribute list. The relationship between the chapter and page attributes is the same as that between the book attributes and attributes of lower layers. For this reason, the "book", "chapter", and "page" attributes can be restated as lowermost page attributes. That is, even when only "book" attributes are designated, these book attributes are applied to each individual page. In the first embodiment, a term "page attribute" includes these attributes unless otherwise specified.

FIG. 7 shows a data list of watermark attributes. There are two types of watermarks, i.e., a character string and image, each of which holds an ID and setting information.

IDs 1 to 7 indicate character string type watermarks. Each character string type watermark holds information of a character string, font type, font size, style, and binary data. The binary data is an attribute used to hold binary data of an image. For example, when the user designates to enclose a character string in a circle, an image of the circle is held as the binary data.

IDs 8 and 9 indicate other image type watermarks. Each image type watermark holds information of binary data and an image reference destination. Image data is defined using a binary format or a format that refers to an external image stored in the storage unit 109. Data held in the data list in FIG. 7 is only information of each watermark itself. An actual layout position of a watermark on a document page is defined in the aforementioned "book", "chapter", and "page" attributes.

Figures 21, 22:
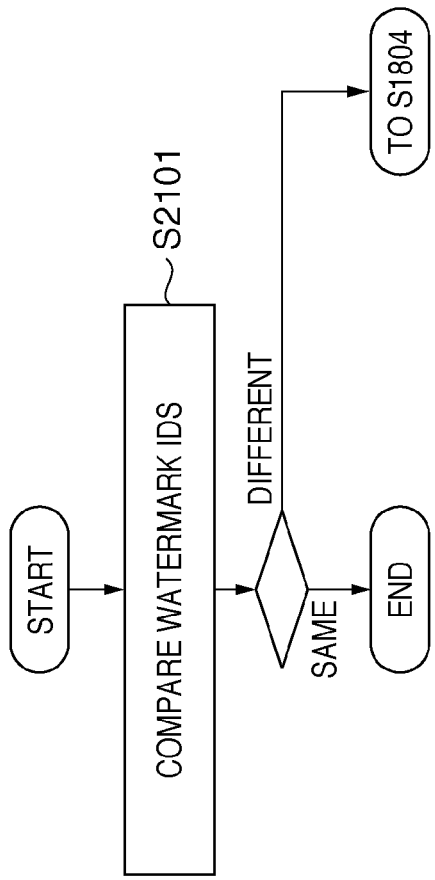
FIG. 21 is a flowchart showing the comparison process when a watermark is a stamp.
FIG. 22 is a view showing a data list used to manage comments/annotation attributes of the watermark attributes.

FIG. 22 shows a data list used to manage comment/annotation attributes of the watermark attributes. Various types of comment/annotation attributes are available: for example, a text box, speech balloon text, marker (underline, etc.), hatching, and so forth. These types of attributes can be varied by the document editing apparatus, and individually hold IDs and setting information. As the setting information, the same information equivalent to the data list shown in FIG. 7 above is held. If there are pieces of setting information (i.e., "fill of marker" in ID 4) unique to the comment/annotation attributes, these pieces of setting information are added to the data list and are managed.

Figure 8:
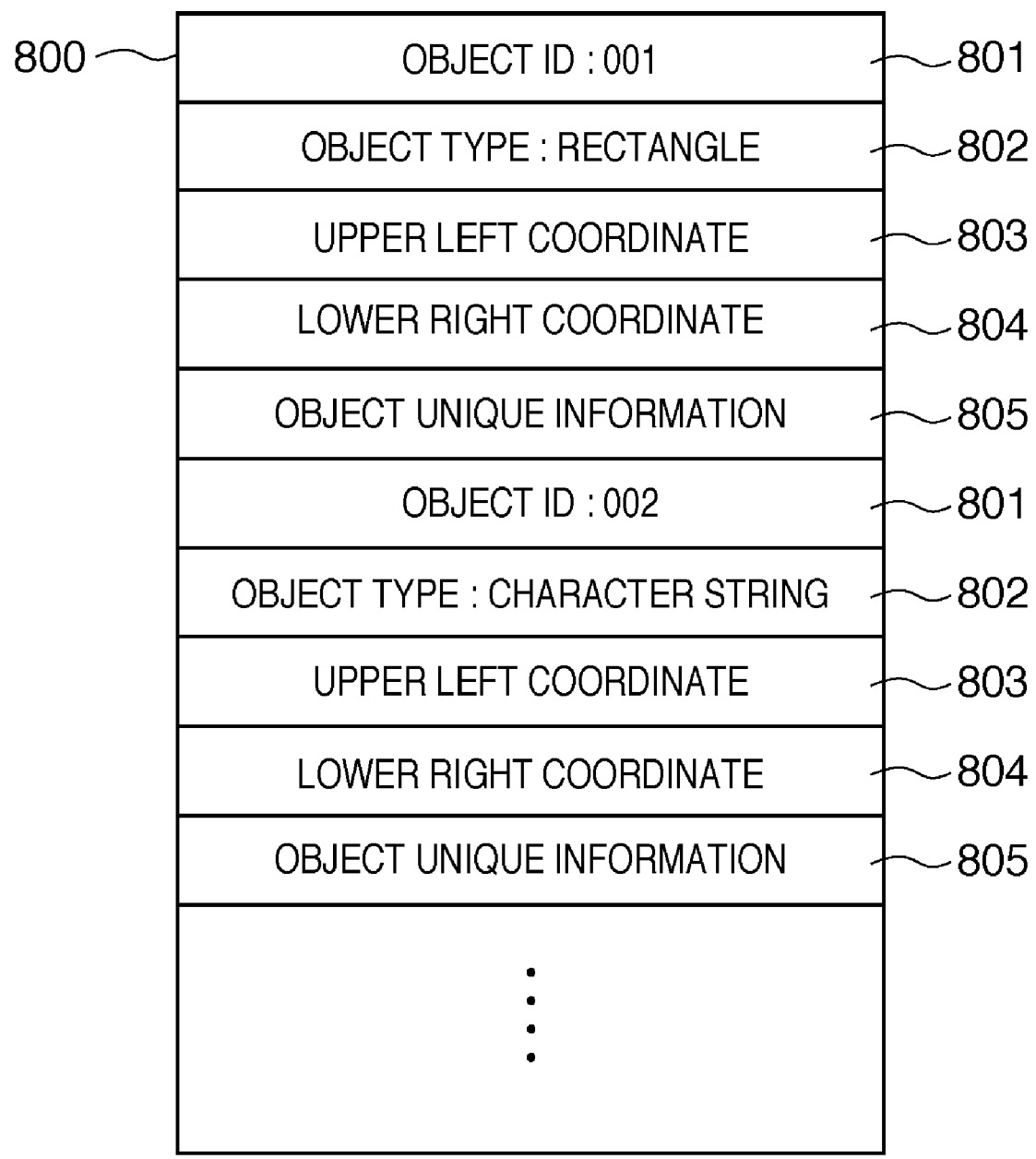
FIG. 8 is a view showing an example of an object list which manages object information in a page which forms document data.

FIG. 8 is a view showing an example of an object list used to manage object information in each page which forms document data. Each object includes an ID 801, object type 802, coordinates 803 and 804 indicating the position of the object, and object unique information 805. That object is stored in an object list 800 to have the list structure. As the object list 800, one list may be held for the entire document data or for each page. Analysis of an object and generation of a list will be described later.

<Page Attribute Setting>

A page attribute setting method will be described below. The document editing unit 203 executes this process according to an instruction from the GUI unit 201, and registers setting information in the aforementioned "book", "chapter", and "page" attribute lists in FIGS. 4 to 6, and the watermark data list in FIG. 7.

FIG. 15 is a view showing a watermark definition dialog 1501. The GUI unit 201 displays the watermark definition dialog 1501 on the display 107 according to an instruction from the input device 108. When the user inputs instructions in respective controls in the dialog, the GUI unit 201 sends the instructions to the document editing unit 203, which registers setting information in the page attribute list.

The watermark definition dialog 1501 includes:
a character string designation control 1502 used to designate a character string used as a watermark;
a font designation control 1503 used to designate a font type of the character string;
a style designation control 1504 used to designate a style of the character string;
a font size designation control 1505 used to designate a font size of the character string; and
a color designation control 1506 used to designate a color of the character string.

Respective settings designated on the watermark definition dialog 1501 are registered in the attribute list in FIG. 7.

FIG. 16 is a view showing a watermark designation dialog 1601. The watermark designation dialog 1601 allows the user to designate information for each of "book", "chapter", and "page". For example, when the user designates a watermark on the watermark designation dialog while he or she selects "book" on the GUI unit 201, that watermark is registered as an attribute of "book".

The watermark designation dialog 1601 includes:

a watermark designation control 1602 used to designate a watermark to be overlaid on a page; and a watermark layout designation control 1603 used to designate a layout position of a watermark on a page.

Figure 17:
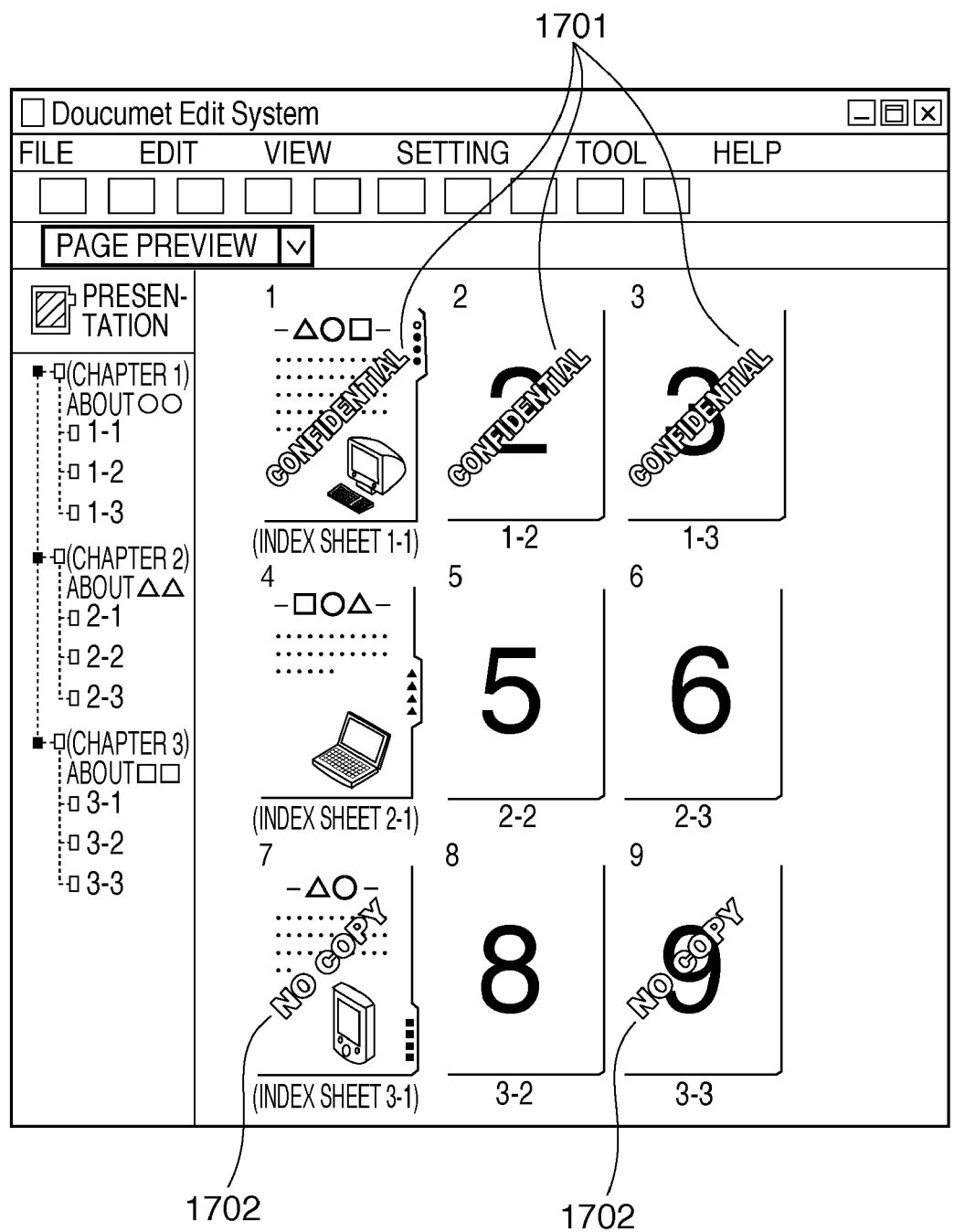
FIG. 17 is a view showing a setting example of watermarks with respect to a book shown in FIG. 14.

FIG. 17 is a view showing a setting example of watermarks with respect to the book shown in FIG. 14. For document data including a total of 9 pages, a watermark "CONFIDENTIAL" is designated on the first to third pages (first chapter). Also, a watermark "NO COPY" is designated on the seventh and ninth pages.

<Object Analysis>

Object analysis and a registration method of the aforementioned object list will be described below. The data analysis unit 205 executes this process by accessing document data stored in the storage unit 109 in accordance with an instruction from the document editing unit 203. FIG. 8 is a view showing an example of information stored in the object list 800. For example, a rectangular object which is located at coordinates 900A in FIG. 9 is registered as a list to have contents 900B.

Figure 9:
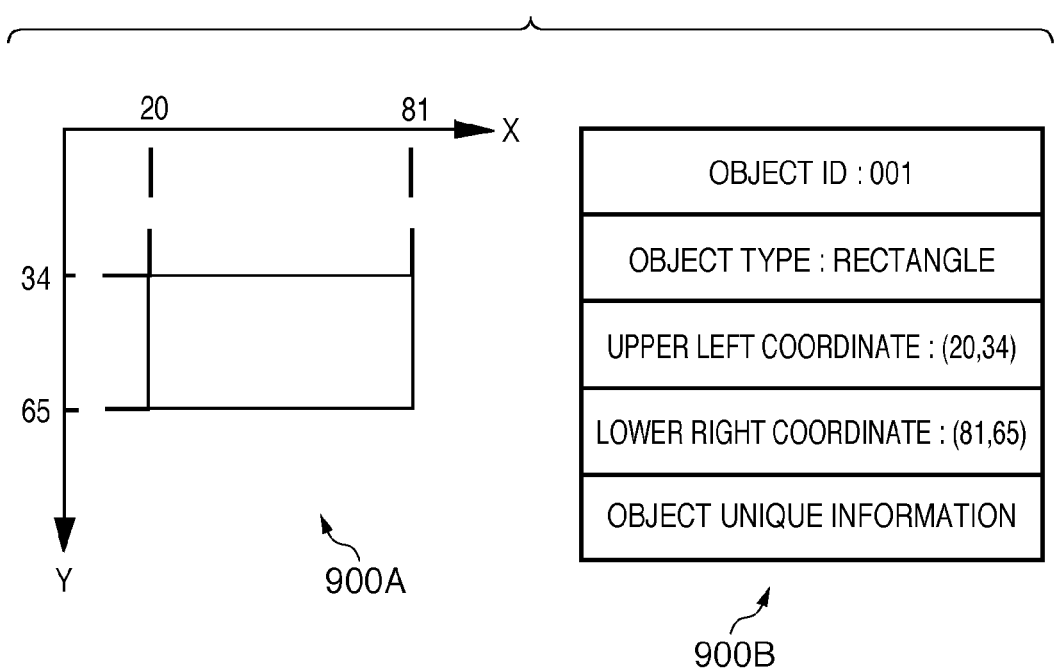
FIG. 9 is a view showing a rectangular object and a corresponding list.
Figure 10:
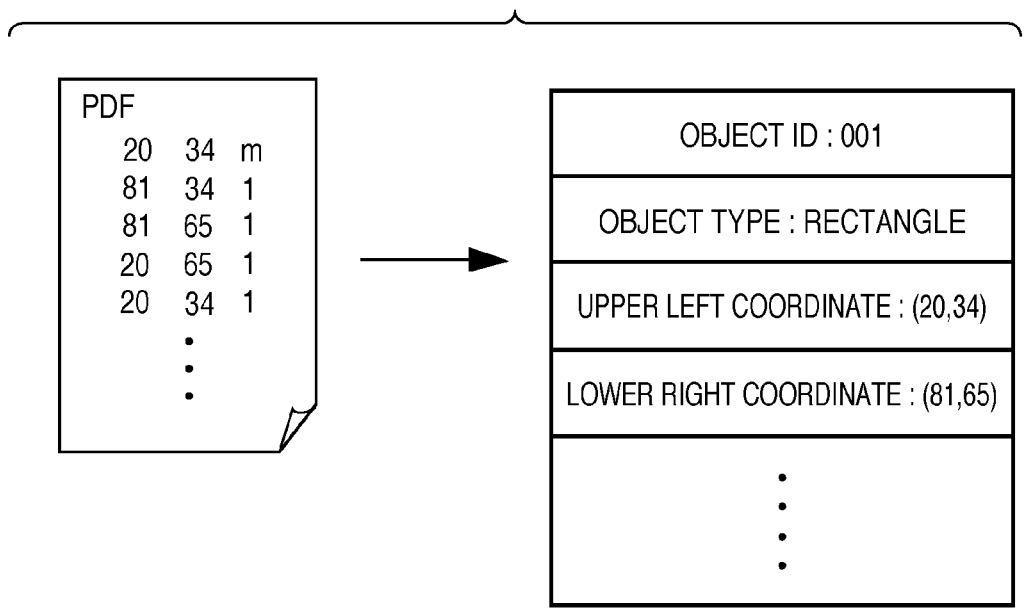
FIG. 10 is a view showing an extraction example of object information from the internal format of document data.

FIG. 10 is a view showing an example of loading the same rectangular object as that shown in FIG. 9 from the internal format of document data, and extracting it as object information.

Figure 11:
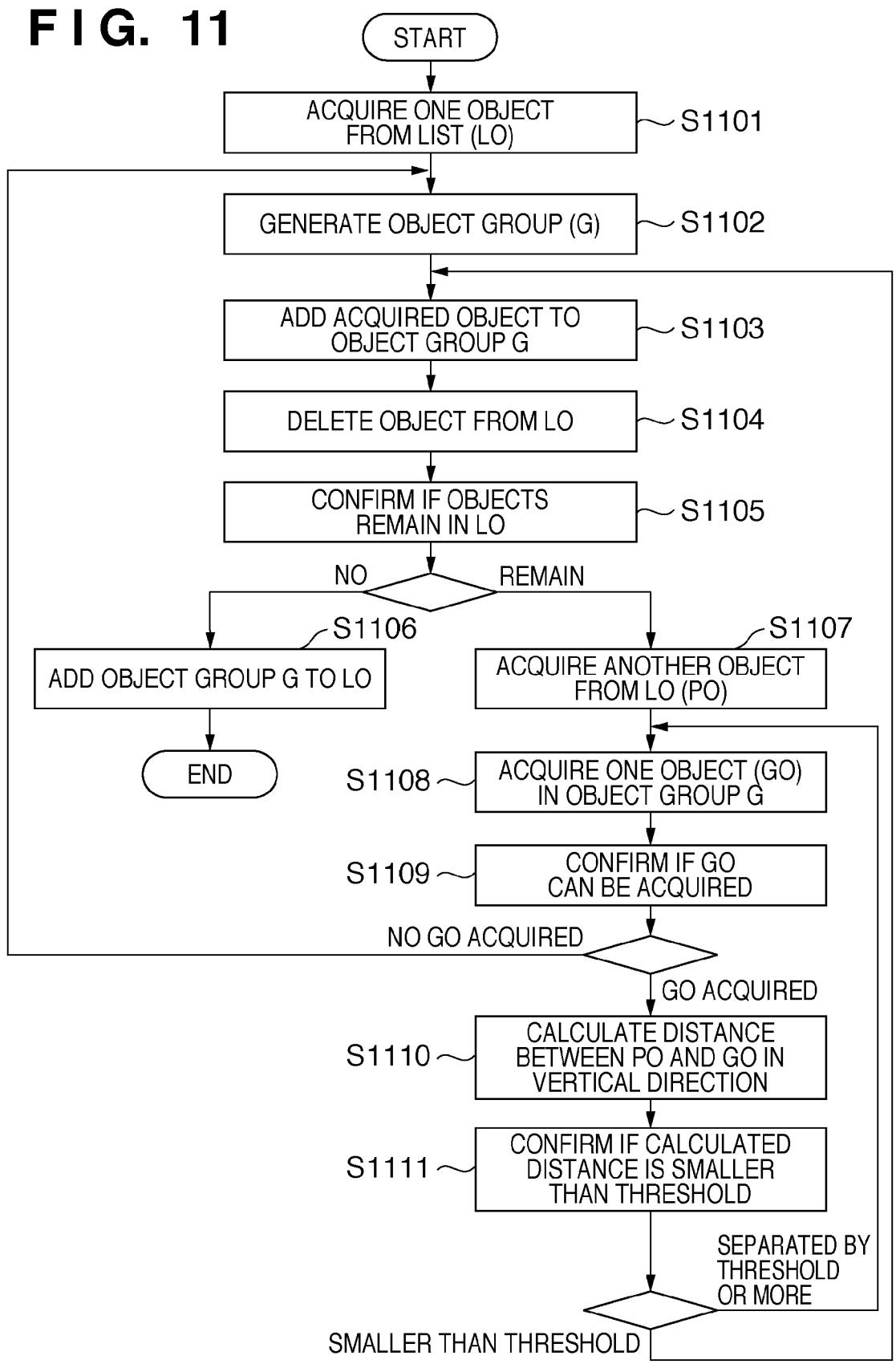
FIG. 11 is a flowchart showing the sequence for a block combination process of objects used in the first embodiment.

FIG. 11 is a flowchart showing the sequence for a block combination (grouping) process of objects used in the first embodiment. The data analysis unit 205 executes this process.

The data analysis unit 205 acquires one object from the object list LO 800 (S1101), and generates a new object group G (S1102). The object group has the same format as the object list, and that data format allows each processing unit to manipulate as one object.

The data analysis unit 205 adds the object acquired in step S1101 to the object group G (S1103), and deletes that object from the list LO (S1104). The data analysis unit 205 confirms if objects to be added still remain in the list LO (S1105). If no object to be added remains, the data analysis unit 205 adds the group G to the list LO (S1106), thus ending the processing.

If objects to be added still remain in the list LO, the data analysis unit acquires the next object PO from the list LO (S1107), and acquires an object GO in the object group G (S1108). If the data analysis unit 205 fails to acquire the object GO (S1109), the process returns to step S1102. If the data analysis unit 205 can successfully acquire the object GO (S1109), the data analysis unit 205 calculates a distance between the objects PO and GO in the vertical direction (S1110).

Figure 12:
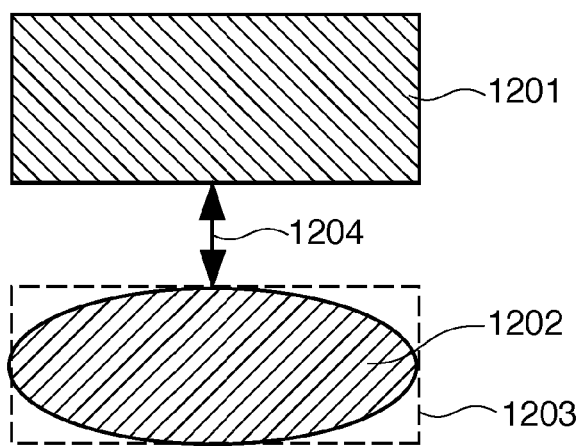
FIG. 12 is a view for explaining a "distance" between objects.

FIG. 12 is a view for explaining the "distance" between objects. Under the assumption of a circumscribed rectangle that encloses an object, the "distance" between objects is the shortest distance between circumscribed rectangles. In FIG. 12, reference numeral 1201 denotes a rectangular object; 1202, an elliptic object; and 1203, a circumscribed rectangle of the elliptic object. The length of an arrow 1204 corresponds to the distance between these objects.

Furthermore, the data analysis unit confirms if the calculated distance is smaller than a threshold (S1111). If the calculated distance is equal to or larger than the threshold, the process returns to step S1108. If the distance is smaller than the threshold, the process returns to step S1103. Note that the "threshold" is a distance having a given value specified by the system, and objects to be combined as a block are separated by this threshold of the distance.

Figure 13:
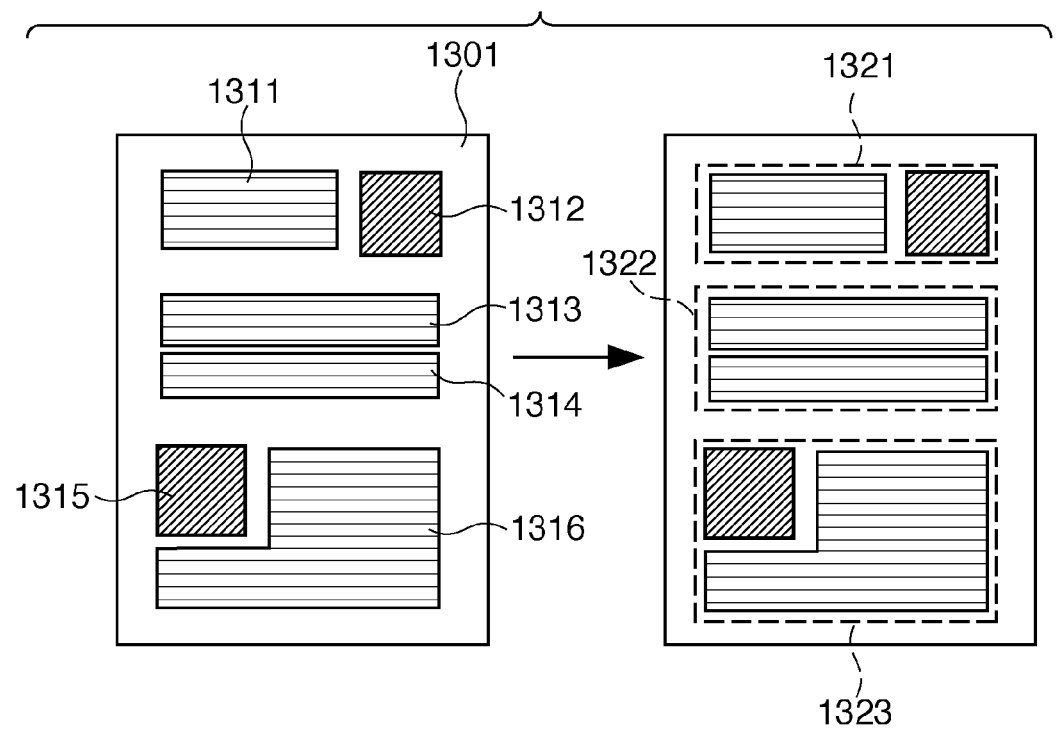
FIG. 13 is a view showing a block combination state of objects.

FIG. 13 is a view showing the block combination states of objects. On a page 1301, objects 1311 and 1312 are combined as a block 1321, as indicated by the dotted line. Likewise, objects 1313 and 1314 are combined as a block 1322, and objects 1315 and 1316 are combined as a block 1323.

In the first embodiment, a unit of an object to be edited in a page is considered as a "block" including some objects in place of objects as minimum divisions. Of course, an arrangement that handles minimum divisions as units is also available. For this reason, the sequence for editing objects in the first embodiment targets at blocks. Hence, in the following description, an "object" also includes a "block" formed by combining objects, as shown in FIG. 13.

<Operation of Apparatus>

Figure 18:
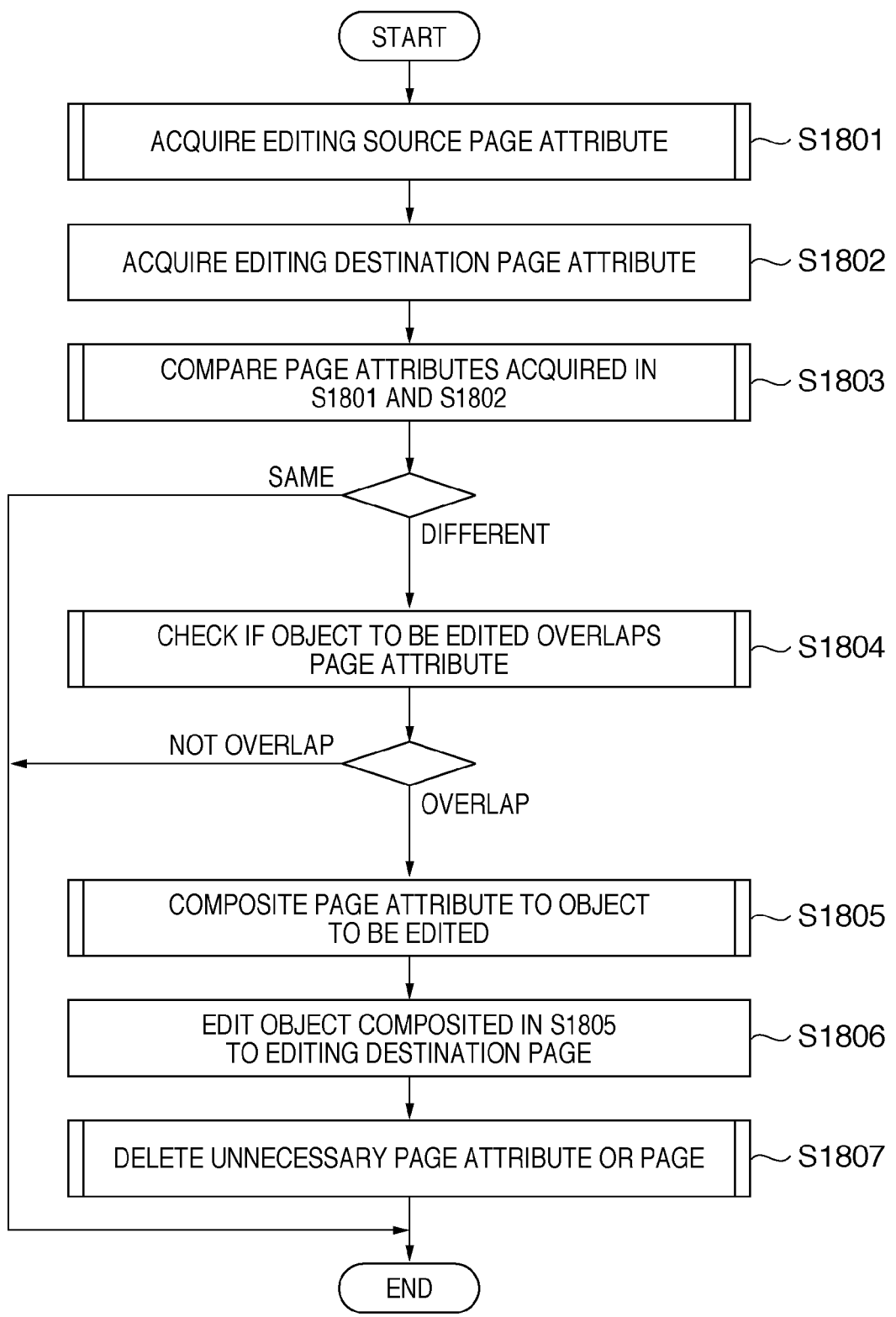
FIG. 18 is a flowchart showing the editing operation in the document editing apparatus according to the first embodiment.

FIG. 18 is a flowchart showing the editing operation in the document editing apparatus according to the first embodiment. In the first embodiment, the editing operation includes a move process (cut & paste) and a copy process (copy & paste) of an object between different pages. For example, an editing operation for moving or copying an object on the third page to the second page is executed. In the following description, a page where an object is currently laid out will be expressed as a term "editing source page", and a page where the object is to be located after the move or copy process will be expressed as a term "editing destination page".

When the user executes the move or copy operation of an object using the input device 108, the GUI unit 201 detects this operation with respect to the input device 108, and issues an instruction according to the operation to the input control unit 202. Upon reception of the instruction, the input control unit 202 instructs the document editing unit 203 to execute the move or copy process of the object according to the operation. Upon reception of the instruction, the document editing unit 203 accesses the data analysis unit 205 to acquire an object to be edited, and starts the instructed move or copy operation. After that, the input control unit 202 designates an editing destination page, and the document editing unit 203 executes the move or copy operation of the object to the editing destination page.

Figure 19:
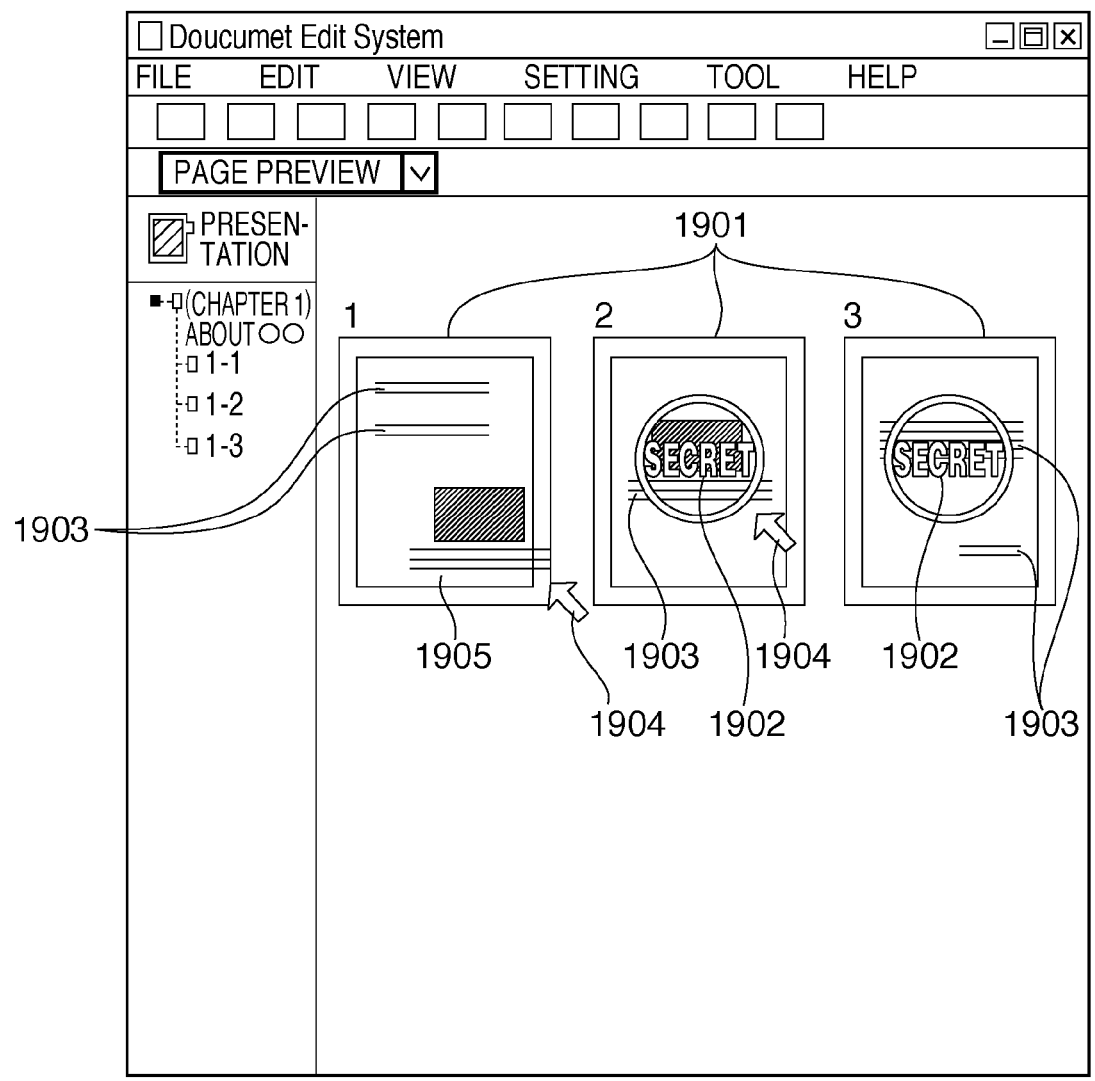
FIG. 19 is a view showing an example of display of an object editing GUI.

In this case, when page information of an editing source (e.g., the page 303B in FIG. 3) designated from the input control unit 202 is different from page information of an editing destination (e.g., the page 303A in FIG. 3), the editing process across the pages is to be executed according to the flowchart shown in FIG. 18. FIG. 19 is a view showing a display example of an object editing GUI.

Reference numeral 1901 denotes a page; and 1902, a page attribute (which indicates a "SECRET" stamp in FIG. 19). Reference numeral 1903 denotes an object which exists on the page 1901. Note that the stamp 1902 is illustrated on a conceptual basis, and is not actually rendered on the page. Reference numeral 1904 denotes a mouse cursor. For example, when the user designates an object on the second page using the mouse cursor, moves it to the first page (reference numeral 1905 denotes a ghost during movement), and decides a layout position, the processing starts according to the flowchart shown in FIG. 18 to have the above user's operation as a trigger. That is, the processing starts by the user's operation for selecting the object 1903 on the page 1901 using the mouse cursor 1904 and moving or copying it to a different page. Note that when the user selects the object 1903 using the mouse cursor 1904, the ghost 1905 is displayed.

In step S1801, attribute information of the editing source page is acquired from the "book", "chapter", and "page" attribute lists shown in FIGS. 4 to 6. In step S1802, attribute information of the editing destination page is similarly acquired. Taking the page attribute list (FIG. 6) as an example, watermark IDs included in attributes Nos. 2, 3, and 4 are acquired as page attribute information. A practical process is the same as those in steps S2001 and S2006 to be described later. If no watermark ID is acquired in step S1802, "NULL" is used as acquired information.

In step S1803, the page attributes acquired in steps S1801 and S1802 are compared. If the two page attributes match, the instructed object editing operation is executed for the editing destination page.

If it is determined in step S1803 that the different page attributes are acquired, it is checked in step S1804 if an object to be edited overlaps the page attribute acquired in step S1801. If it is determined that the object does not overlap the page attribute, the instructed object editing operation is executed for the editing destination page. On the other hand, if the object overlaps the page attribute, the process advances to step S1805.

In step S1805, the page attribute acquired in step S1801 is composited to the object to be edited.

In step S1806, the object to be edited that has undergone the composition process in step S1805 (composite object) is moved/copied to the editing destination (move destination/copy destination) page. In this case, it is preferable to render a circumscribed rectangle of the composite object. This process is to present a visual effect indicating which object the page attribute of the editing source composited in step S1805 influences after composition.

In step S1807, the page attribute or page itself, which becomes unnecessary as a result of the object editing operation, is deleted.

After execution of the aforementioned series of processes, the object editing operation of the composite object to the editing destination page is executed. When the object is moved, information of the moved object to be edited is deleted from the object list of the editing source page, and is added to the object list of the editing destination page. On the other hand, when the object is copied, information of the copied object to be edited is added to the object list of the editing destination page. Note that steps S1804, S1806, and S1807 are not indispensable processes, and may be omitted.

<Details of Page Attribute Acquisition Process (S1801)>

Figure 20:
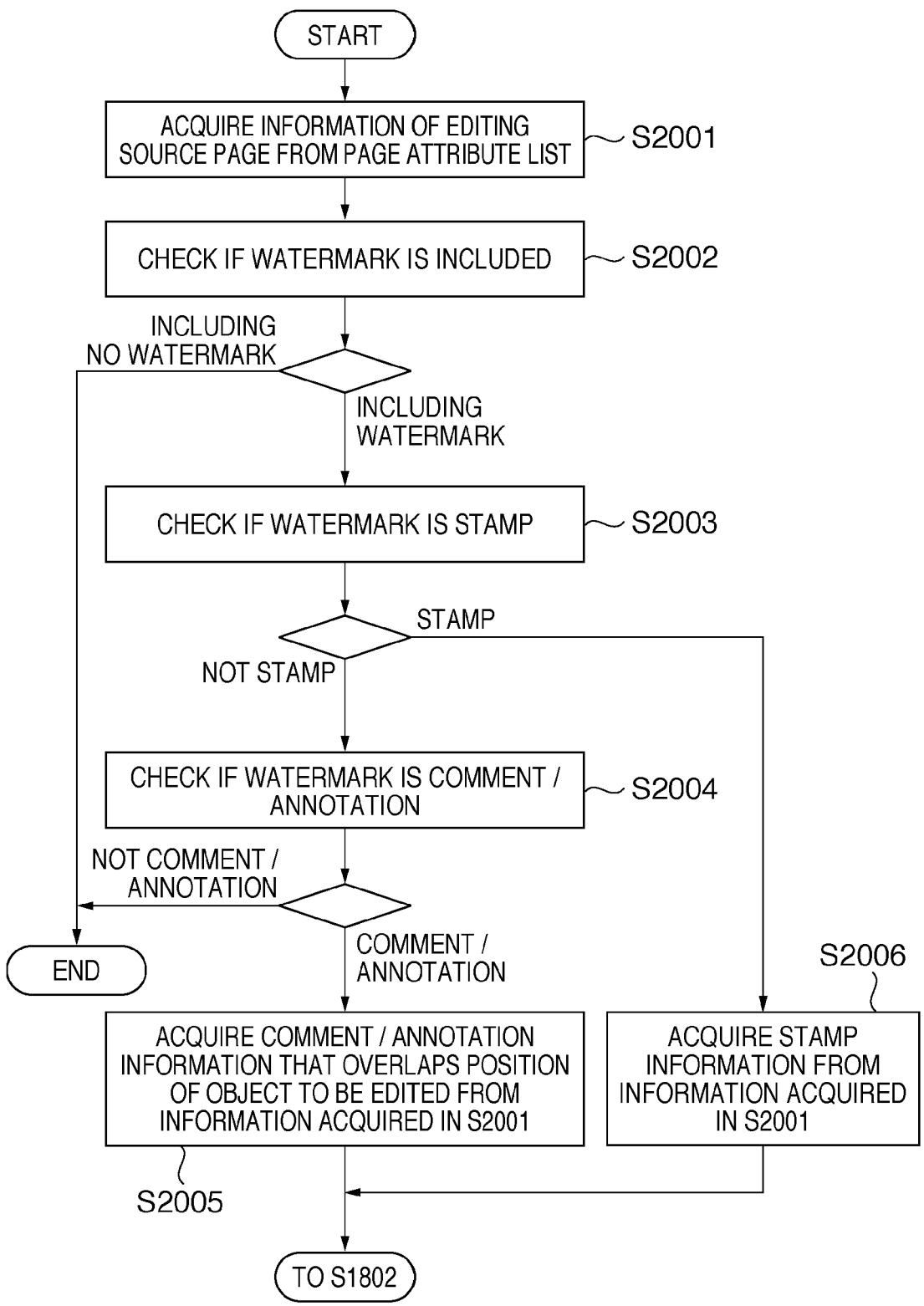
FIG. 20 is a flowchart showing details of the process in step S1801.

FIG. 20 is a flowchart showing details of the process in step S1801.

In step S2001, information of the editing source page attribute is acquired from the "book", "chapter", and "page" attribute lists shown in FIGS. 4 to 6. In this process, assuming that the page 303B in FIG. 3 is an editing source page, the page attribute (2) of the page 303B is accessed to acquire the page attribute list (FIG. 6).

It is checked in step S2002 if the page attribute information acquired in step S2001 includes a watermark. If the page attribute information does not include any watermark, a normal editing operation is executed. For example, this process is attained by seeing whether or not the attributes Nos. 2, 3, and 4 in the aforementioned page attribute list shown in FIG. 6 are included. If the page attribute information includes a watermark, the process advances to step S2003.

It is checked in step S2003 if the watermark is a stamp (whether or not the attribute No. 2 in FIG. 6 is included).

If the watermark is a stamp, only information (attribute No. 2 in FIG. 6) associated with the stamp is acquired from the page attribute information acquired in step S2001 (S2006). Alternatively, an ID (a watermark ID held in the attribute No. 2 in FIG. 6) associated with the stamp is acquired to allow to access information.

If the watermark is not a stamp, it is checked if the watermark is a comment/annotation (whether or not the attribute No. 4 in FIG. 6 is included) (S2004). If the watermark is a comment/annotation, only information (attribute No. 4 in FIG. 6) associated with the comment/annotation is acquired from the page attribute information acquired in step S2001 (S2005). Alternatively, an ID (a watermark ID held in the attribute No. 4 in FIG. 6) of the comment/annotation is acquired to allow to access information.

In step S2005, only an ID which overlaps the object to be edited is acquired from the comments/annotations held as the page attribute. This is to extract only a comment/annotation associated with the object to be edited when the page includes a plurality of comments/annotations (when a plurality of watermark IDs are held in the attribute No. 4 in FIG. 6). Whether or not the comment/annotation overlaps the object is determined by comparing the position information on the page held in the watermark ID in the attribute No. 4 of the page attribute list (FIG. 6) and that of the object to be edited held in the object list 800.

If the page attribute to be moved or copied to be synchronized with the object to be edited can be acquired in step S2005 or S2006, the process advances to step S1802.

In the aforementioned processes, no checking process associated with a header/footer (attribute No. 3 in FIG. 6) of a watermark is executed. This is because a header/footer such as a page number is an attribute which depends on each page, and should not be changed between pages upon execution of the move or copy process of the object. Therefore, the header/footer is a page attribute to be excluded from the aforementioned composition process (S1805). However, when the page attribute defined for the header/footer includes data which does not depend on each page, a checking process may be added to acquire a page attribute to be composited.

<Details of Page Attribute Comparison Process (S1803)>

Figure 23:
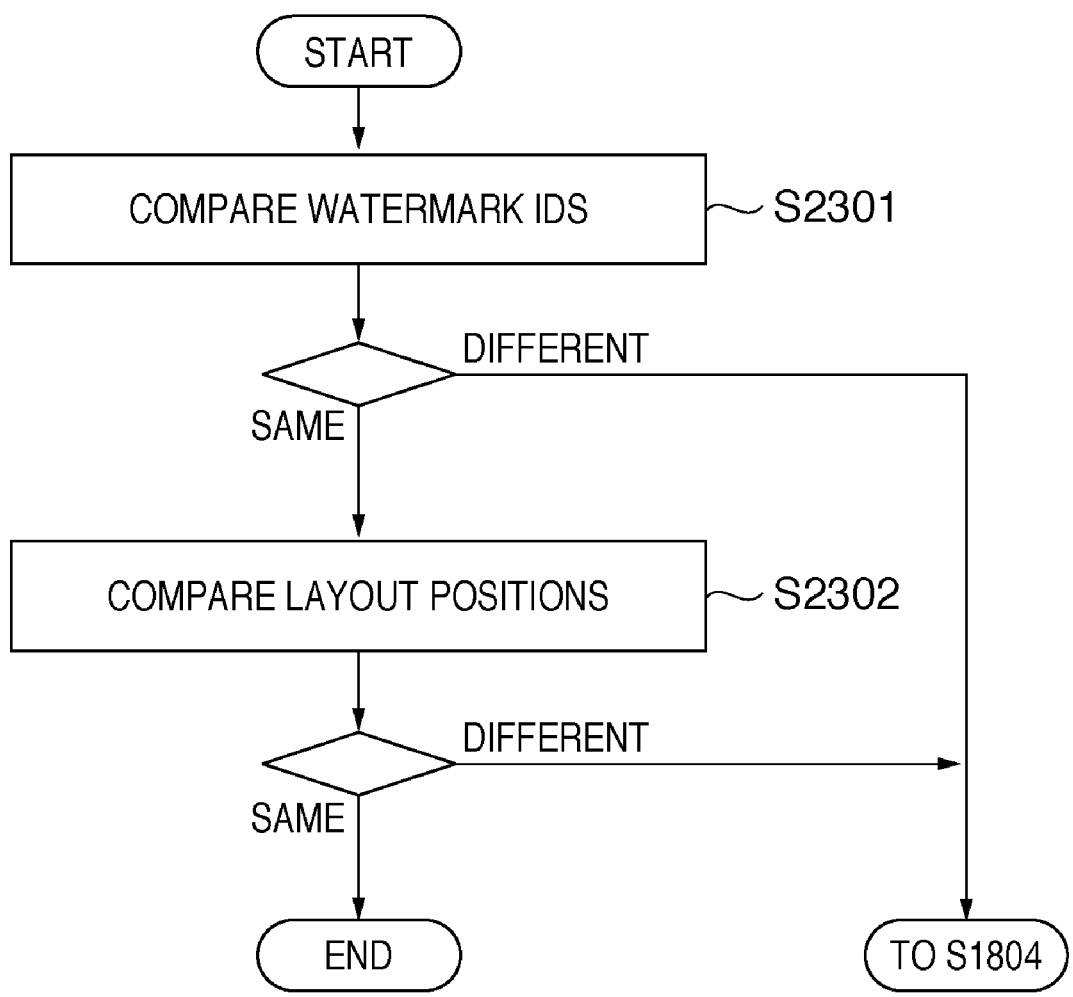
FIG. 23 is a flowchart showing the comparison process when a watermark is a comment/annotation.

FIGS. 21 and 23 are flowcharts showing details of the process in step S1803.

FIG. 21 shows the comparison process when the watermark is a stamp. The watermark IDs acquired in steps S1801 and S1802 are compared (S2101). If these watermark IDs have different values, the process advances to step S1804. If the watermark IDs have the same value, it is determined that the respective watermarks have no difference, and a normal editing operation is executed.

FIG. 23 shows the comparison process when the watermark is a comment/annotation. The watermark IDs acquired in steps S1801 and S1802 are compared (S2301). If these watermark IDs have different values, the process advances to step S1804. If the watermark IDs have the same value, the layout positions corresponding to the respective watermark IDs are compared (S2302). In case of a comment/annotation, identical settings are rarely adopted across pages. However, for example, when review ranges are to be indicated by a hatched annotation, they may be designated by the same range (position) on a plurality of pages as a whole. The checking process of the layout positions is executed in step S2302 under the assumption of such case. If the layout positions corresponding to the watermark IDs are different, the process advances to step S1804. If the layout positions corresponding to the watermark IDs are identical, it is determined that the respective watermarks have no difference, and a normal editing operation is executed.

<Details of Overlapping Determination Process (S1804) Between Object Region and Page Attribute Region>

Figure 24:
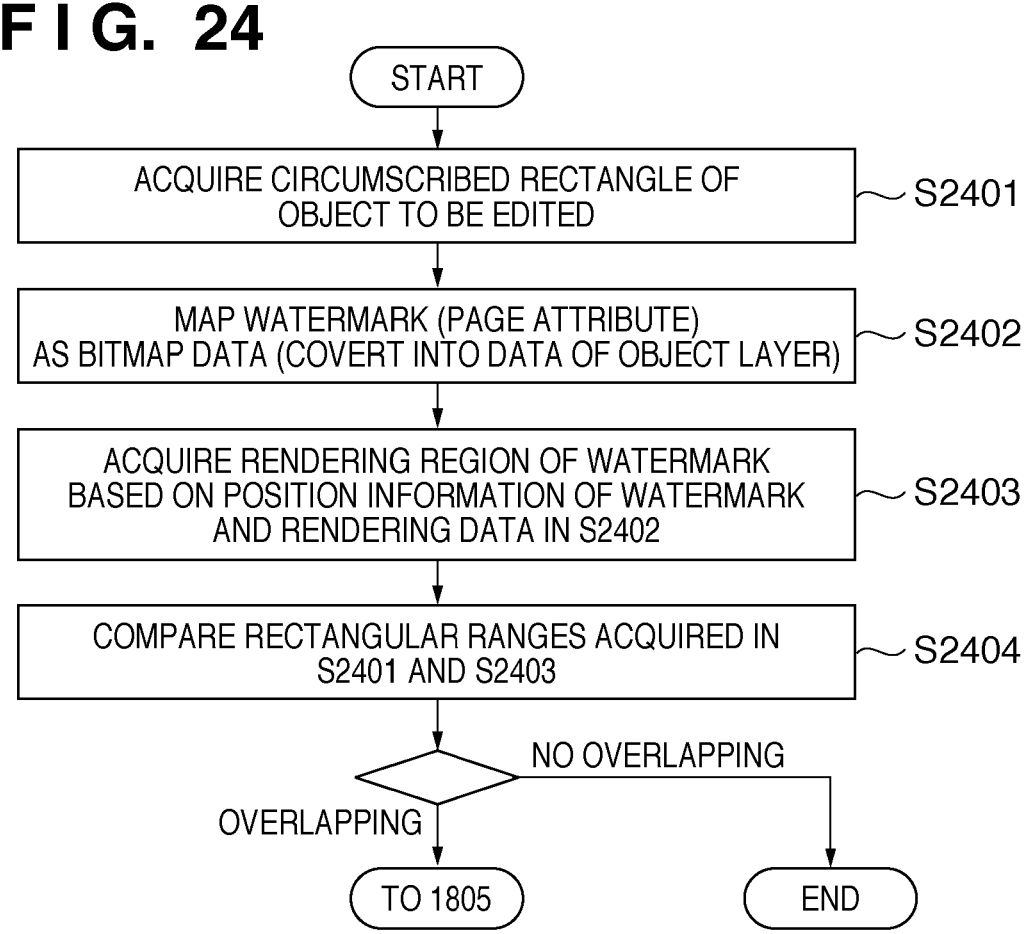
FIG. 24 is a flowchart showing details of the process in step S1804.

FIG. 24 is a flowchart showing details of the process in step S1804. The process in step S1804 is executed when the watermark attribute of the editing source indicates a stamp. This process is not indispensable in case of a watermark attribute other than a stamp. However, for a watermark having the same nature as a stamp, this process may be executed.

In step S2401, a circumscribed rectangular region of the object to be edited is acquired based on the position (coordinate) information (coordinates 803 and 804, etc.) of the object to be edited held in the object list 800. At this time, when a plurality of objects included in a single page are designated as the objects to be edited, a rectangular region that encloses respective designated objects is acquired as a circumscribed rectangular region.

Figure 33:
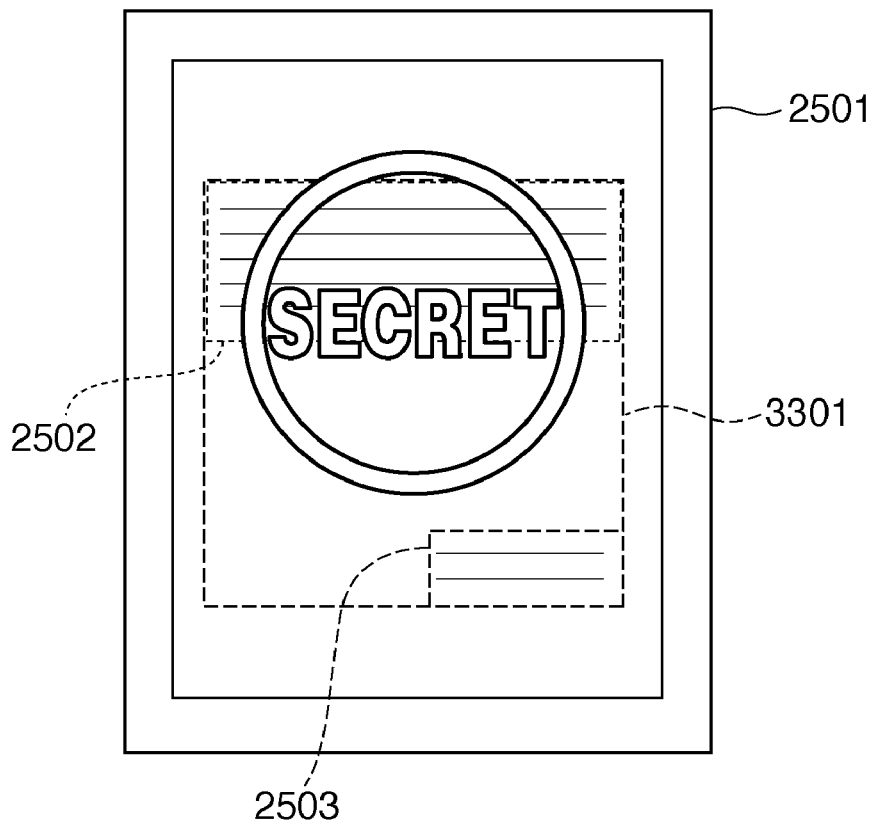
FIG. 33 is a view showing a case in which a plurality of objects to be edited are designated at the same time.

FIG. 33 is a view showing a case in which a plurality of objects to be edited are designated at the same time. Reference numeral 2501 denotes a page; and 2502 and 2503, objects. When the objects 2502 and 2503 are designated at the same time, a rectangular region 3301 which encloses both the objects is acquired as a circumscribed rectangular region.

In step S2402, the watermark acquired from the page attribute of the editing source (the watermark ID held in the attribute No. 2 in FIG. 6) is mapped (rendered) as bitmap data on a memory. Note that the page attribute of the editing source is the page attribute list in FIG. 6, which is accessible from the page information (2) of the page 303B.

In step S2403, a watermark rendering region (a circumscribed rectangular region thereof) is acquired based on the rendering data mapped in step S2402 and the position information (watermark position information held in the data shown in FIG. 6) that can be acquired from the page attribute of the editing source.

In step S2404, the circumscribed rectangular regions acquired in steps S2401 and S2403 are compared. If these two regions include an overlapping part, the process advances to step S1805. If these regions do not include any overlapping part, a normal editing operation is executed.

The aforementioned process is executed to set the watermark as that to be composited in step S1805 when the watermark and object to be edited include an overlapping part on the editing source page.

Figure 25:
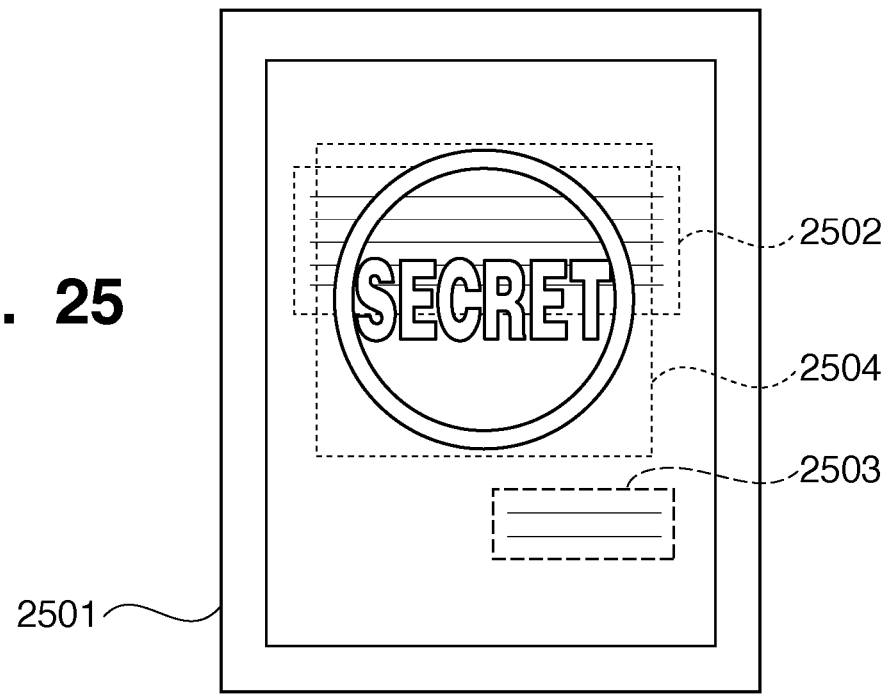
FIG. 25 is a view showing examples of cases with and without an overlapping part.

FIG. 25 is a view showing examples of cases with and without an overlapping part. Reference numeral 2504 denotes a watermark and circumscribed rectangular region. Since the circumscribed rectangular regions of an object 2502 and watermark 2504 include an overlapping part, when the object 2502 is selected as the object to be edited, the watermark 2504 is set as that to be composited. On the other hand, since an object 2503 and the watermark 2504 do not include any overlapping part, when the object 2503 is selected as the object to be edited, the watermark 2504 is not set as that to be composited.

<Details of Composition Process (S1805)>

Figure 26:
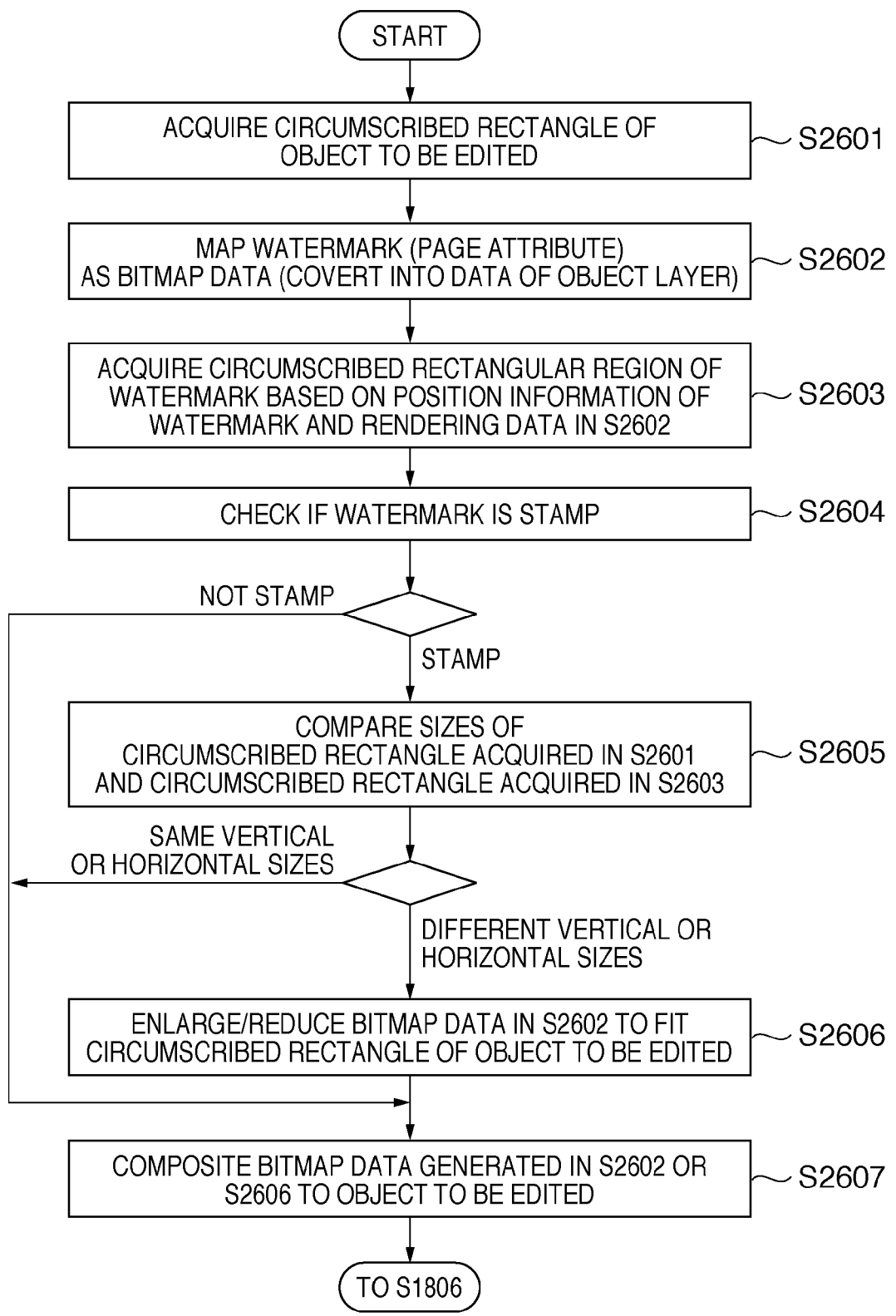
FIG. 26 is a flowchart showing details of the process in step S1805.

FIG. 26 is a flowchart showing details of the process in step S1805. Note that steps S2601 to S2604 are respectively the same as the processes in steps S2401 to S2403 and step S2003 described above, and a detailed description thereof will not be repeated.

In steps S2601 to S2603, the watermark to be composited is converted into bitmap data, and its circumscribed rectangular region is acquired. That is, the watermark is converted into a format that can be composited to the object to be edited.

Note that when the watermark is already mapped as bitmap data in step S2402, that bitmap data may be reused.

It is checked in step S2604 if the watermark is a stamp. If the watermark is not a stamp, the bitmap data generated in step S2602 is composited to the object to be edited (S2607). If the watermark is a stamp, a process for enlarging or reducing the watermark to fit the size of the object to be edited is executed in steps S2605 and S2606.

In step S2605, the size of the circumscribed rectangle of the object to be edited acquired in step S2601 is compared with that of the circumscribed rectangle of the watermark acquired in step S2603.

In step S2606, if the vertical or horizontal sizes are different, an enlargement/reduction ratio is calculated to fit the circumscribed rectangle size of the object to be edited, thus enlarging/reducing the bitmap data obtained in step S2602.

Figure 27:
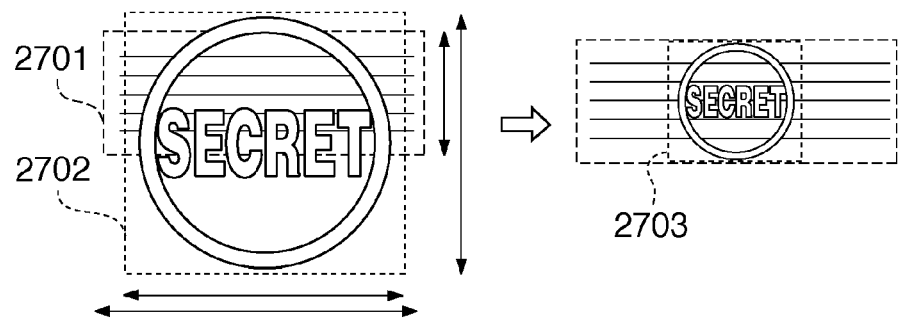
FIG. 27 is a view showing an example of the enlargement/reduction process in step S2602.

FIG. 27 is a view showing an example of the enlargement/reduction process in step S2602. Reference numeral 2701 denotes a circumscribed rectangular region of the object to be edited; and 2702, a circumscribed rectangular region of the watermark. Since the vertical and horizontal sizes are different, the enlargement/reduction ratio is calculated so that the circumscribed rectangle 2702 of the watermark is included in the circumscribed rectangular region of the object to be edited (a circumscribed rectangular region 2703), thus applying the enlargement/reduction process to the bitmap data to be included in the circumscribed rectangular region. The enlargement/reduction process may use either equal magnifications or different magnifications in the vertical and horizontal direction.

Of course, the user may designate the magnifications. In step S2607, the bitmap data which is generated in step S2602 or has undergone the enlargement/reduction process in step S2606 is composited to the object to be edited. The composition process is executed so that the central points of the object to be edited and the bitmap data of the watermark are matched. Note that the central point of the object to be edited is calculated from coordinates held in the object list 800. Also, the central point of the bitmap data of the watermark is calculated based on the circumscribed rectangle size acquired in step S2603 or the size obtained by applying the enlargement/reduction process to that circumscribed rectangle size in step S2606. Furthermore, the type and position (coordinates) of the composited bitmap data of the watermark are registered in the object list 800 to have a new ID, and is managed as the same block as the composited object to be edited.

After the composition process is executed in step S2607, the process advances to step S1806. Step S1806 is the process for moving or copying the object to be edited composited in step S2607 to the editing destination page. The object to be edited and watermark composited in step S2607 are acquired from the object list 800, and are registered in the object list 800 of the editing destination page. In coordinate data (coordinates 803 and 804, etc.) of the object list 800, move/copy position information on the editing destination page received from the GUI unit 201 and input control unit 202 is registered. In case of a data structure which does not manage the object list 800 for each page, a process for changing a link to a page of the object IDs of the object to be edited and watermark is executed.

Figure 28:
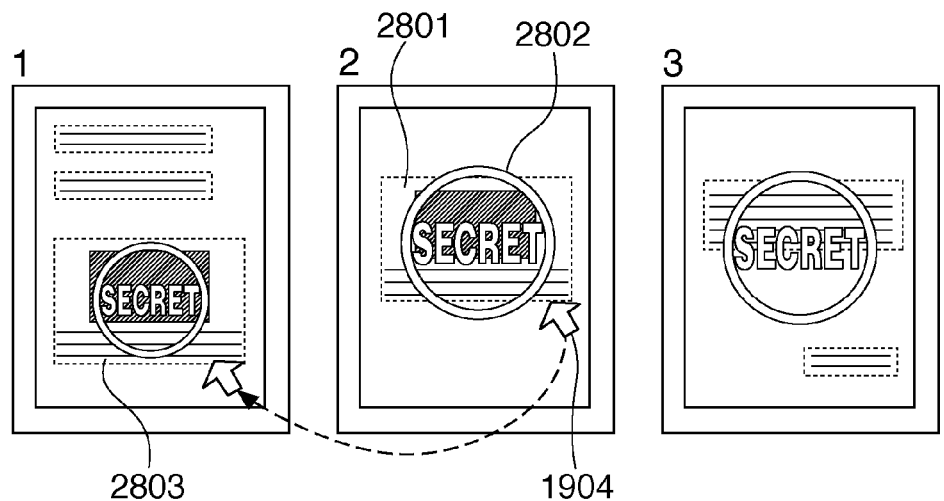
FIG. 28 is a view showing a state in which a watermark as a stamp is composited to an object, and the composited watermark and object are moved.

FIG. 28 is a view showing a state in which a watermark as a stamp is composited to an object, and the composited watermark and object are moved. Reference numeral 2801 denotes an object to be edited before movement; and 2802, a stamp ("SECRET" enclosed in a circle) held as the page attribute. When the user moves the object to be edited 2801 to the first page using the cursor 1904, the stamp ("SECRET" enclosed in a circle) is composited to the object to be edited (a region 2803). With this processing, the object clearly specified as "SECRET" can be clearly specified as "SECRET" even after page movement.

Figure 29:
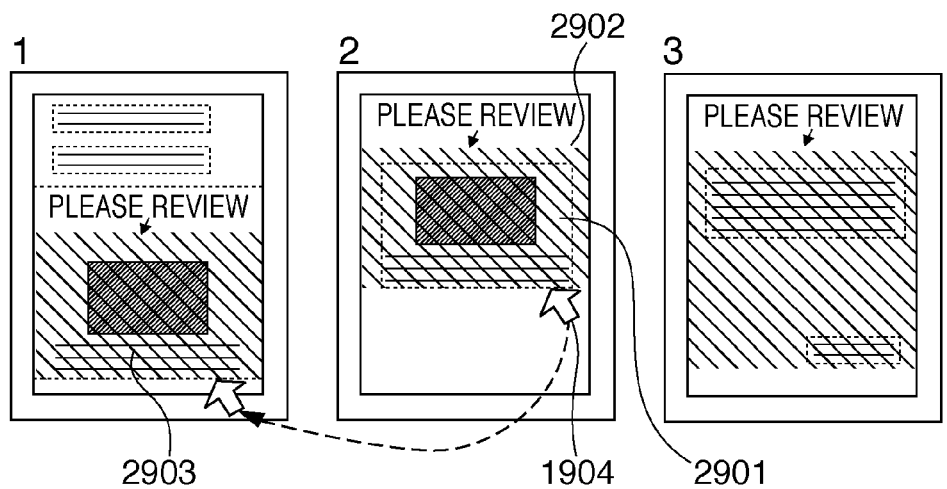
FIG. 29 is a view showing a state in which a watermark as a comment is composited and moved.

FIG. 29 is a view showing an example in which a watermark as a comment (a review target is indicated by hatching) is composited and moved. Reference numeral 2901 denotes an object to be edited before movement; and 2902, a comment held as the page attribute. In this case, a hatched region including a character string "please review" is designated as the comment. When the user moves the object to be edited 2901 to the first page using the mouse cursor 1904, the comment is composited to the object to be edited (a region 2903). With this processing, the review range clearly specified by the comment can be clearly specified while maintaining the range even after object movement between pages.

Figure 30:
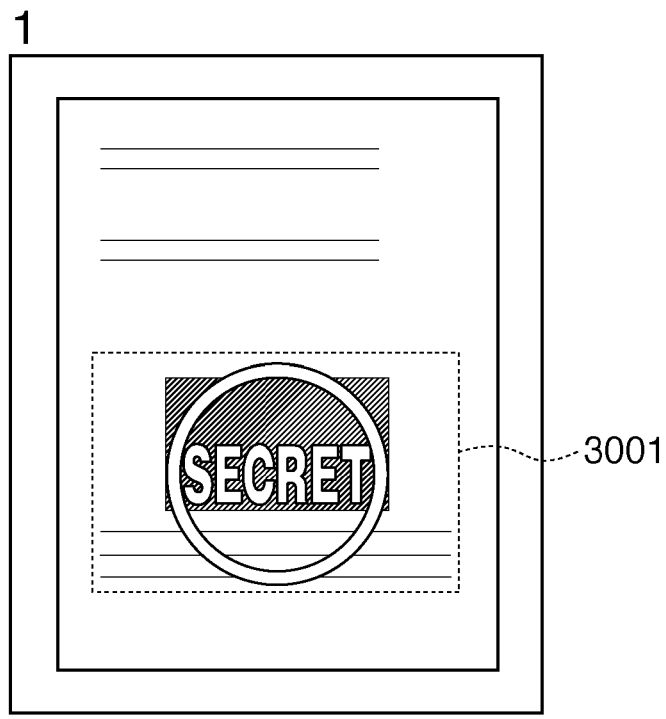
FIG. 30 is a view showing an object to be edited when a watermark is composited to an object and they are moved between pages.

FIG. 30 is a view showing an object to be edited when a watermark is composited to an object, and they are moved between pages. Reference numeral 3001 denotes a circumscribed rectangle of the object to be edited, which is actually rendered on a page. By displaying the circumscribed rectangle of the object to which the watermark is composited, the effective range of the watermark can be clearly specified to the user. This rendering process of the circumscribed rectangle is not an indispensable process, and can be omitted. The rendering process of the circumscribed rectangle may be executed/skipped according to a user's designation.

<Details of Post-process (S1807)>

Figure 31:
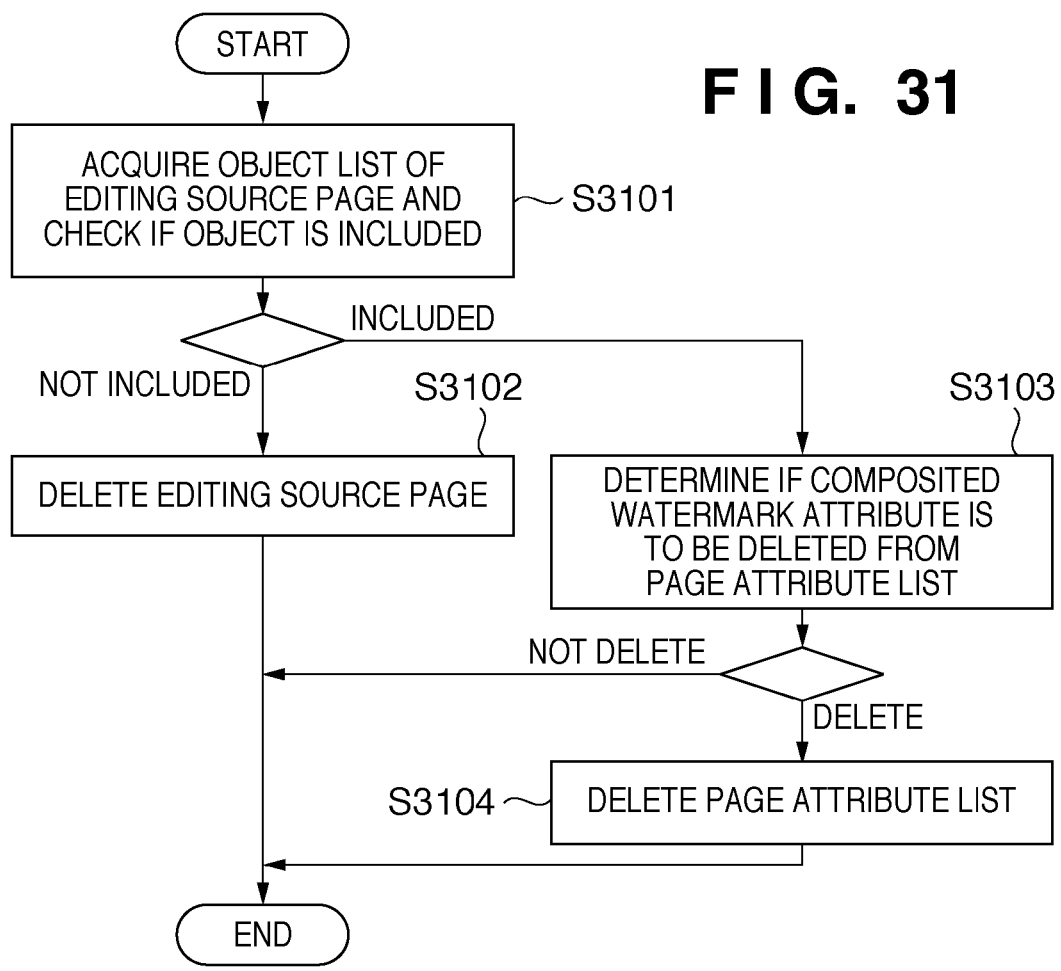
FIG. 31 is a flowchart showing details of the process in step S1807.

FIG. 31 is a flowchart showing details of the process in step S1807.

In step S3101, the object list of the editing source page is acquired to check if the page includes an object. For example, in case of a format that manages the object list for each page, whether or not the object list is empty is checked.

If no object is included, the editing source page is deleted in step S3102, thus ending the processing. On the other hand, if an object is included, it is checked in step S3103 if the composited watermark attribute is deleted from the page attribute list.

Figure 34:
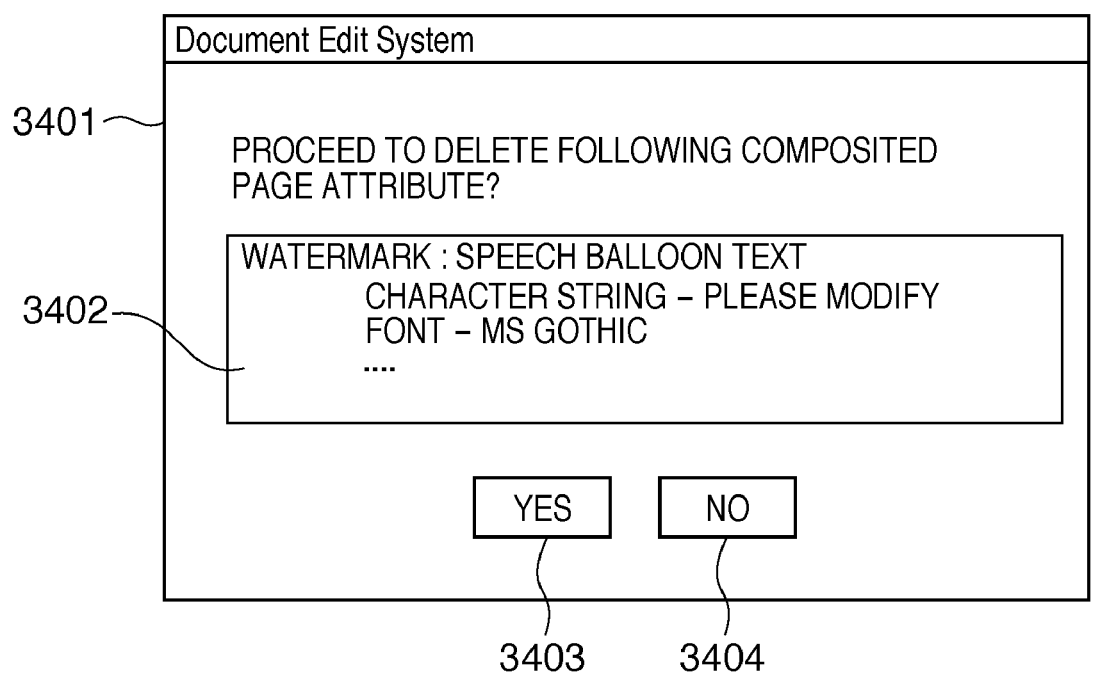
FIG. 34 is a view showing an example of GUI display when a checking process is executed based on a user's designation.

FIG. 34 is a view showing an example of GUI display when the checking process is executed based on a user's designation. Reference numeral 3401 denotes a message dialog; 3403, a YES button used to close the message by accepting the message contents; and 3404, a NO button used to close the message by rejecting the message contents. Reference numeral 3402 denotes a text box which displays the composited watermark attribute set in the editing source page.

On this GUI display, upon reception of pressing of the YES button 3403 from the input control unit, it is determined that the composited watermark attribute is to be deleted, and the target watermark attribute is deleted from the page attribute list (S3104). Upon reception of pressing of the NO button 3404 from the input control unit, it is determined that the composited watermark attribute is not to be deleted, thus ending the processing.

Note that the checking process in step S3103 may be automatically processed by the document processing system.

Figure 32:
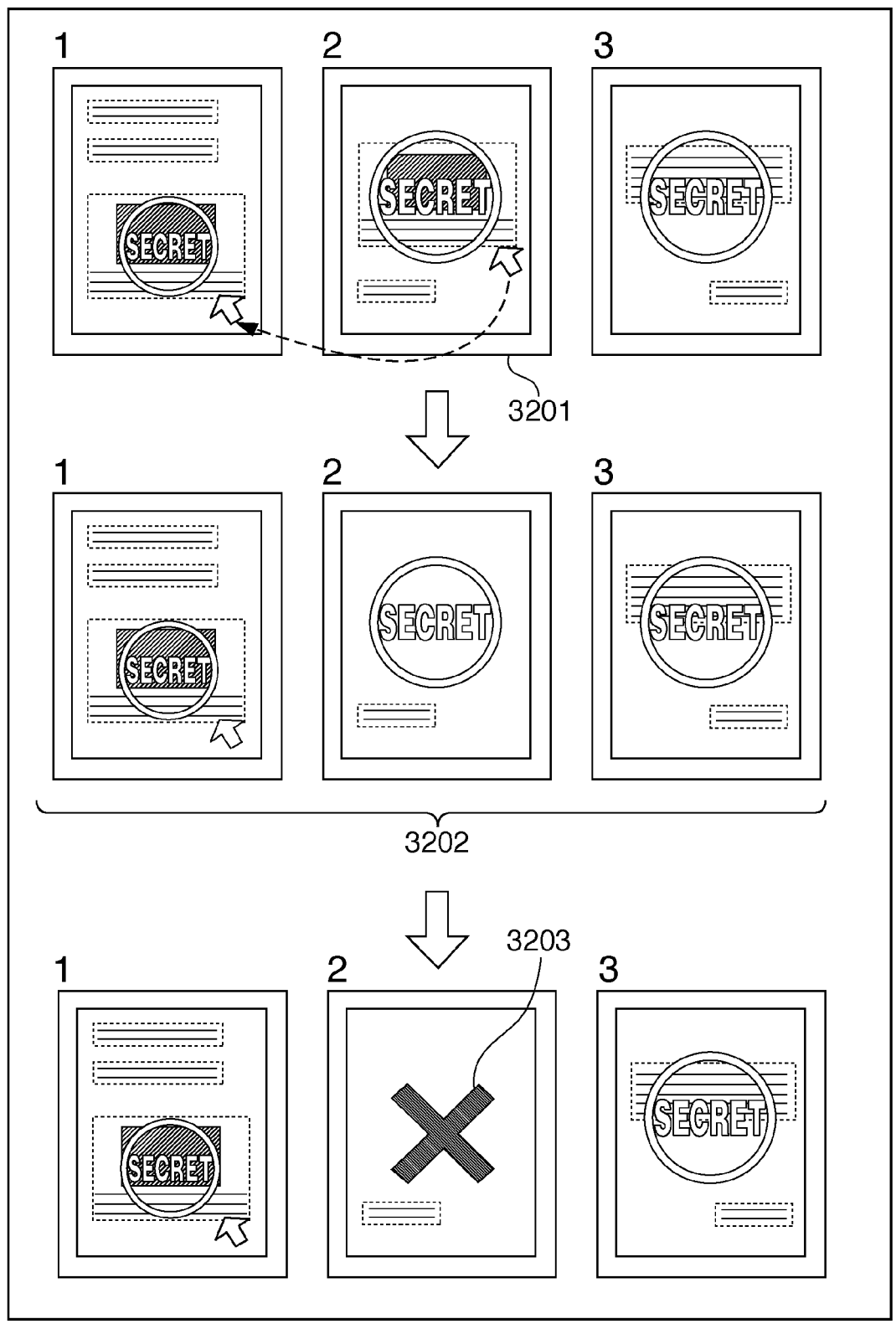
FIG. 32 is a view for explaining the processes executed when it is determined in step S3103 that a composited watermark attribute is to be deleted.
Figure 35:
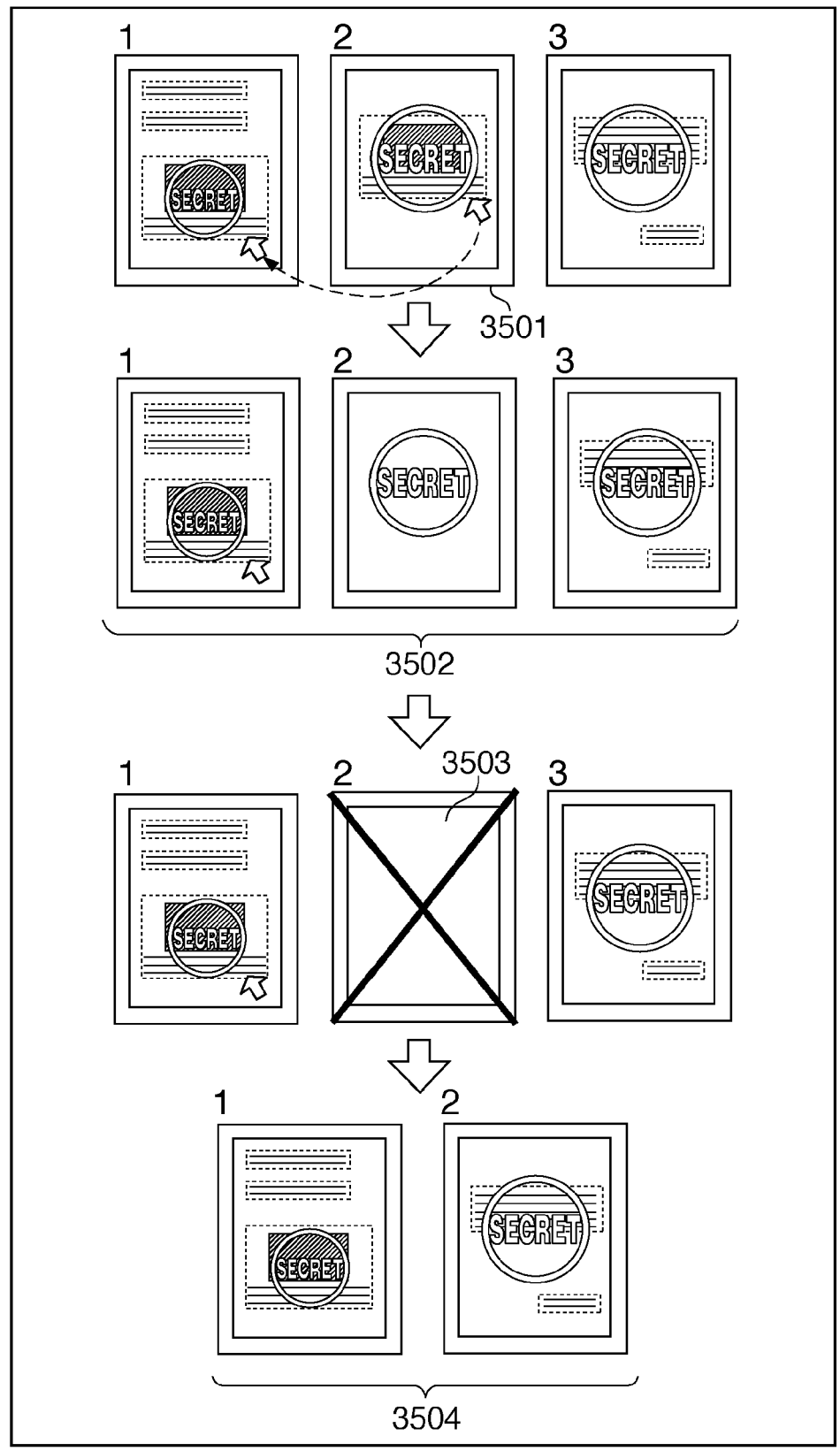
FIG. 35 is a view for explaining the processes executed when it is determined in step S3101 that no object on a editing source page exists.
Figure 36:
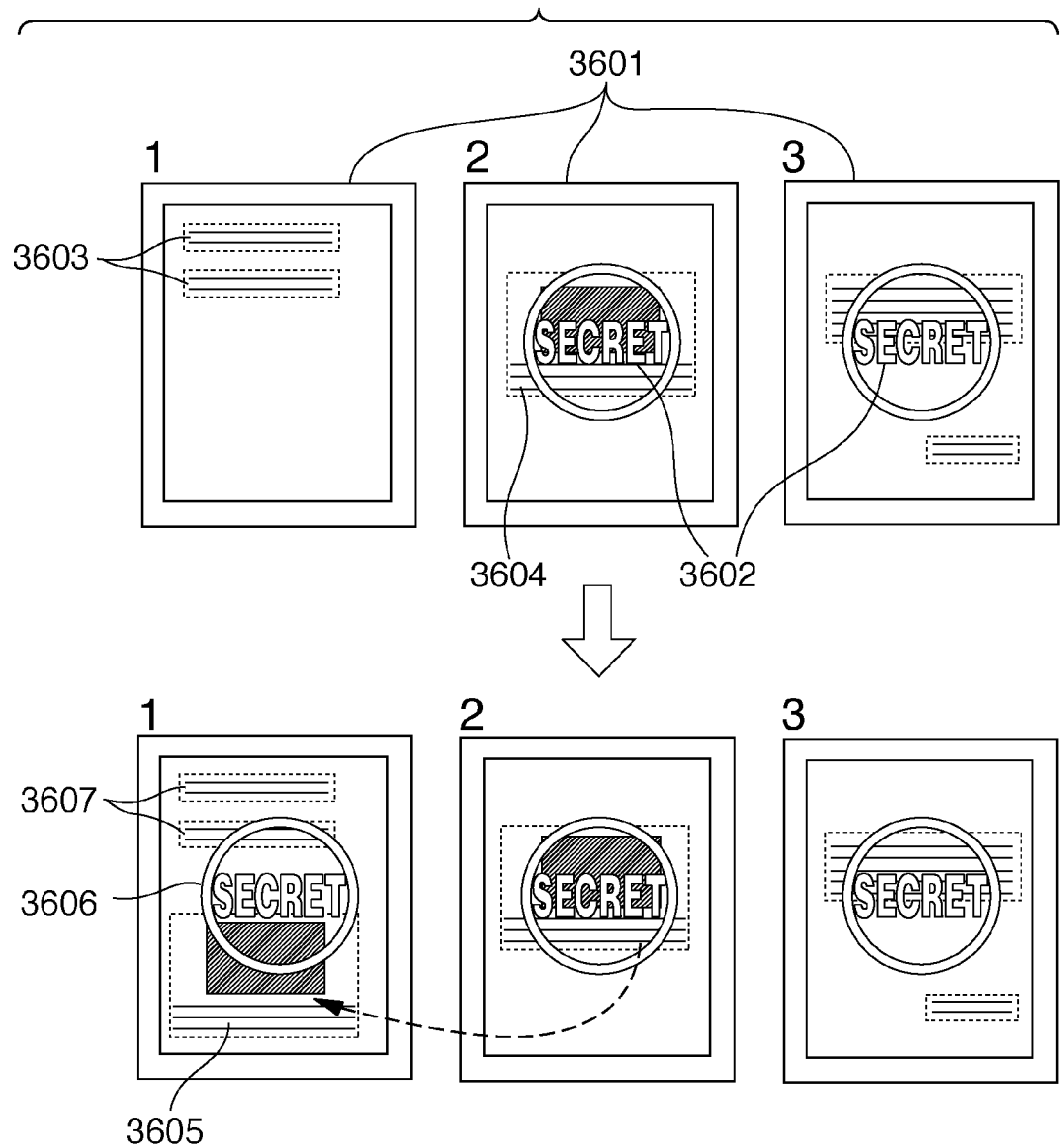
FIG. 36 is a view for explaining an example of the conventional problem.

FIGS. 32 and 35 are views for explaining the processes in FIG. 31, i.e., showing an example of a case in which in document data including three pages, an object on the second page is composited to a watermark ("SECRET" enclosed in a circle), and the composited object and watermark are moved to the first page.

FIG. 32 is a view for explaining the processes executed when it is determined in step S3103 that the composited watermark attribute is to be deleted. Reference numeral 3201 denotes a composite movement of the object and watermark. Reference numeral 3202 denotes a state in which the object on the second page is moved to the first page. When it is determined that the composited watermark attribute is to be deleted, the watermark ("SECRET" enclosed in a circle) on the second page is deleted (a cross mark 3203).

FIG. 35 is a view for explaining the processes executed when it is determined in step S3101 that no object is included in the editing source page. Reference numeral 3501 denotes a composite movement of the object and watermark. Reference numeral 3502 denotes a state in which the object on the second page is moved to the first page. In this state, only the watermark attribute remains on the editing source page. Since no object is included in the second page, that page is deleted, as denoted by reference numeral 3503, and document data includes two pages, as denoted by reference numeral 3504.

As described above, according to the document editing apparatus of the first embodiment, even when the editing process of an object in document data is executed, an inconsistency between that object and a page attribute can be eliminated. More specifically, when the page attribute is composited to the rendering object to be edited, the rendering object laid out on the editing destination page can express the page attribute on the editing source page. Furthermore, an unnecessary page attribute can be eliminated from being appended to other rendering objects originally laid out on the editing destination page.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001106, filed Jan. 6, 2009, which is hereby incorporated by reference herein in its entirety.

What is claimed is:

1. A document editing apparatus for editing document data including a plurality of pages, the apparatus comprising:
   at least one processor that executes a computer program stored in a storage medium, wherein the computer program, when executed, causes the at least one processor to function as each of:
   a determination unit configured to determine whether or not a move process or a copy process of an object across pages is executed for the document data;
   a first acquisition unit configured to acquire at least one of a stamp, a comment and an annotation from a page attribute of an editing source page when said determination unit determines that the move process or the copy process of the object across the pages is executed;

a second acquisition unit configured to acquire at least one of a stamp, a comment and an annotation from a page attribute of an editing destination page;

a comparison unit configured to compare the at least one of the stamp, the comment and the annotation of the editing source page with the at least one of the stamp, the comment and the annotation of the editing destination page, and determine whether the at least one of the stamp, the comment and the annotation of the editing source page is different from that of the editing destination page;

a composition unit configured to composite at least one of the stamp, the comment and the annotation of the editing source page with the object to generate a composite object when said comparison unit determines that the at least one of the stamp, the comment and the annotation of the editing source page is different from that of the editing destination page; and a layout unit configured to lay out the composite object generated by said composition unit on the editing destination page.

2. The apparatus according to claim 1, wherein said composition unit converts the at least one of the stamp, the comment and the annotation of the editing source page into a format which is configured to be composited with the object, and composites the converted information with the object.

3. The apparatus according to claim 1, wherein when said first acquisition unit acquires the stamp of the editing source page, said composition unit generates the composite object by enlarging or reducing an image generated based on the stamp of the editing source page to be included in a rectangular region that circumscribes the object, and composites the enlarged or reduced image with the object.

4. The apparatus according to claim 1, wherein when the move process or the copy process is simultaneously applied to a plurality of objects, said composition unit composites only one piece of the at least one of the stamp, the comment and the annotation of the editing source page with the plurality of objects.

5. The apparatus according to claim 1, further comprising:

a determination unit configured to determine whether at least one of the stamp, the comment and the annotation of the editing source page overlaps the object;

wherein said composition unit composites the at least one of the stamp, the comment and the annotation of the editing source page with the object when said comparison unit determines that at least one of the stamp, the comment and the annotation of the editing source page is different from that of the editing destination page and when said determination unit determines that the at least one of the stamp, the comment and the annotation of the editing source page overlaps the object.

6. A method of controlling a document editing apparatus for editing document data including a plurality of pages, the method comprising the steps of:

acquiring at least one of a stamp, a comment and an annotation from a page attribute of an editing source page when it is determined that a move process or a copy process of an object across the pages is executed;

acquiring at least one of a stamp, a comment and an annotation from a page attribute of an editing destination page;

comparing the at least one of a stamp, the comment and the annotation of the editing source page with the at least one of the stamp, the comment and the annotation of the editing destination page, and determine whether the at least one of the stamp, the comment and the annotation of the editing source page is different from that of the editing destination page;

compositing the at least one of the stamp, the comment and the annotation of the editing source page with the object to a generate a composite object, when it is determined that the at least one of the stamp, the comment and the annotation of the editing source page is different from that of the editing destination page; and laying out the composite object on the editing destination page.

7. A non-transitory computer-readable storage medium storing a computer program, the computer program causing a computer to perform the steps of the method of claim 6.

* * * * *